(12) United States Patent
Wollenhaupt et al.

(10) Patent No.: US 8,371,240 B2
(45) Date of Patent: Feb. 12, 2013

(54) TWIN ROW PLANTER

(75) Inventors: Nyle C. Wollenhaupt, Eden Prairie, MN (US); Edward L. Swenson, Emory, TX (US); William W. Preheim, Minneapolis, KS (US); Monte J. Rans, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 256 days.

(21) Appl. No.: 12/646,379

(22) Filed: Dec. 23, 2009

(65) Prior Publication Data

US 2010/0282147 A1 Nov. 11, 2010

Related U.S. Application Data

(60) Provisional application No. 61/176,050, filed on May 6, 2009.

(51) Int. Cl.
*A01C 7/04* (2006.01)
*A01C 7/06* (2006.01)
*A01C 7/12* (2006.01)

(52) U.S. Cl. ........................................................ 111/185

(58) Field of Classification Search .......... 111/183–185; 222/142

See application file for complete search history.

(56) References Cited

U.S. PATENT DOCUMENTS

| | | | |
|---|---|---|---|
| 1,837,895 A | 4/1928 | Chambers, Jr. | |
| 2,035,058 A | 3/1936 | Feltman | |
| 2,749,856 A | 10/1952 | Fleming | |
| 2,926,819 A * | 3/1960 | Burch | 222/142 |
| 4,285,444 A | 8/1981 | Tye | |
| 4,345,531 A | 8/1982 | Redl | |
| 4,399,757 A | 8/1983 | Maury | |
| 4,603,645 A | 8/1986 | Wiemeyer | |
| 5,357,884 A | 10/1994 | Bourgault | |
| 6,109,193 A | 8/2000 | Crabb | |
| 6,352,042 B1 | 3/2002 | Martin et al. | |
| 6,499,414 B2 | 12/2002 | Dunham | |
| 6,516,733 B1 | 2/2003 | Sauder | |
| 7,428,874 B2 | 9/2008 | Jones et al. | |
| 7,455,020 B1 | 11/2008 | Cresswell et al. | |
| 7,469,648 B2 | 12/2008 | Bettin | |
| 7,597,055 B2 | 10/2009 | Choulet | |
| 7,603,956 B2 | 10/2009 | Noh et al. | |
| 7,765,943 B2 | 8/2010 | Landphair et al. | |

FOREIGN PATENT DOCUMENTS

| | | |
|---|---|---|
| AU | 509 557 | 5/1980 |
| EP | 0 100 723 | 2/1984 |
| EP | 0 171 535 | 2/1986 |

(Continued)

OTHER PUBLICATIONS

International Search Report for International Applicaiton No. PCT/US2010/129463 Dated Feb. 11, 2010.

*Primary Examiner* — Christopher J. Novosad

(57) ABSTRACT

An apparatus and method to precisely meter and dispense two or more crop inputs with a common metering disc is presented to achieve proper placement in the soil relative to one another. In one embodiment, dry granular or granulized fertilizer is metered from one side of the disc and seed is metered from the opposite side of the same metering disc. The fertilizer is placed in a concentrated "pulse" approximately equal distances between seeds within a common seed furrow and/or between seed furrows to improved nutrient use efficiency by minimizing soil to fertilizer contact and subsequent chemical reactions that make applied supplemental nutrients less available to plants. Pressurized air may be utilized to assist discharge of both the seed and fertilizer from the disc meter to assure precise spacing in the soil. A cover may be placed on the meter and metering disc to recirculate air and thus minimize potential atmospheric contamination from seed coatings and fertilizer materials.

21 Claims, 26 Drawing Sheets

| | FOREIGN PATENT DOCUMENTS | | |
|---|---|---|---|
| EP | 0 280 086 | 8/1988 | |
| EP | 0 348 376 | 12/1989 | |
| FR | 67 063 | 11/1957 | |
| FR | 2 323 308 | 4/1997 | |
| JP | 05153828 | 6/1993 | |
| RS | 2038728 | 9/1995 | |

* cited by examiner

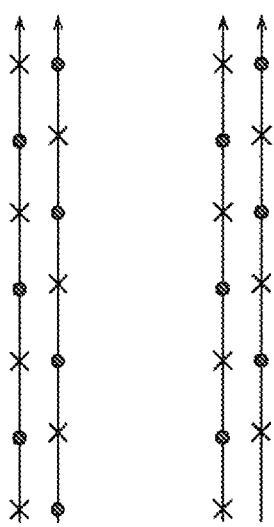 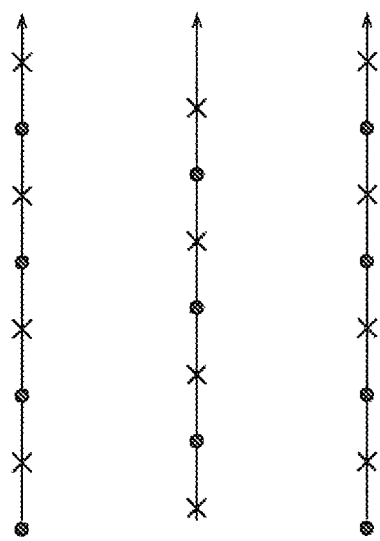
Twin Rows · Narrow Rows
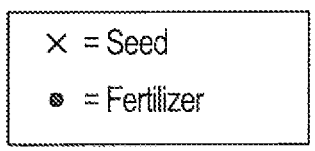
× = Seed
● = Fertilizer
FIG. 22

TWIN ROW PLANTER

CROSS REFERENCE TO RELATED APPLICATIONS

This application claims priority to copending U.S. provisional application No. 61/176,050 filed May 6, 2009, entitled DUAL PRODUCT PRECISION PLANTING METHOD AND APPARATUS, which is entirely incorporated herein by reference. The present U.S. nonprovisional application is related to U.S. nonprovisional application entitled "PRECISION FERTILIZER PLACEMENT", to U.S. nonprovisional application entitled "FERTILIZER TRANSFER CHAMBER FOR METERING DEVICE", to U.S. nonprovisional application entitled "DUAL PRODUCT DISPENSING DISK FOR METERING DEVICE", to U.S. nonprovisional application entitled "AIR ASSISTED SEED DISPENSING", to U.S. nonprovisional application entitled "DISPENSING DISK ALIGNMENT FOR METERING DEVICES", and to U.S. nonprovisional application entitled "SEED METER AIRFLOW COVER", which are incorporated herein by reference, and having been filed concurrently with the present application.

TECHNICAL FIELD

This invention relates to planting equipment and, more particularly, to a meter for dispensing both seeds and fertilizer.

BACKGROUND

Pneumatic planters with a plurality of seed meters are well known to plant seeds upon or in the ground at various depths and spacings. The seeds are singulated and metered by a seed metering disc with pockets, holes or combinations thereof, and using either a vacuum or positive air pressure. However, these known seed meters and seed discs are limited to a single input. Sustainable crop production requires supplemental additions of nutrients in the form of fertilizers. Supplemental nutrients may be applied with the planter but require additional attachments. In addition, only very low concentrations may be applied if the fertilizers are applied on or near the seeds. Low concentrations broadcast or band applied adjacent to or below the seed may be quickly tied up in soil chemical reactions and become unavailable for seedling and plant growth. A point injection (spoke wheel) fertilizer device is capable of concentrating nutrients in the soil, but only nutrients in a liquid form and with variable proximity to the metered seeds. A method and apparatus are needed to allow seed and fertilizer to be metered into the ground at the concentrations and with the precision necessary to minimize nutrient immobilization by soil, avoid seedling injury and optimize the uptake of applied nutrients through the plant life cycle. The fertilizer should be placed as concentrations approximately equal distances between seeds within a seed furrow and/or between seed furrows to minimize plant nutrient immobilizations by soil. This method should increase the nutrient use efficiency of applied supplemental fertilizers and enhance plant productivity.

BRIEF DESCRIPTION OF THE DRAWINGS

FIG. 22 illustrates twin or narrow rows with concentrations of fertilizer granules equally spaced between seeds in seed furrows;

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front" and "rear" are made as viewed from the side of the planter.

Figure 1:
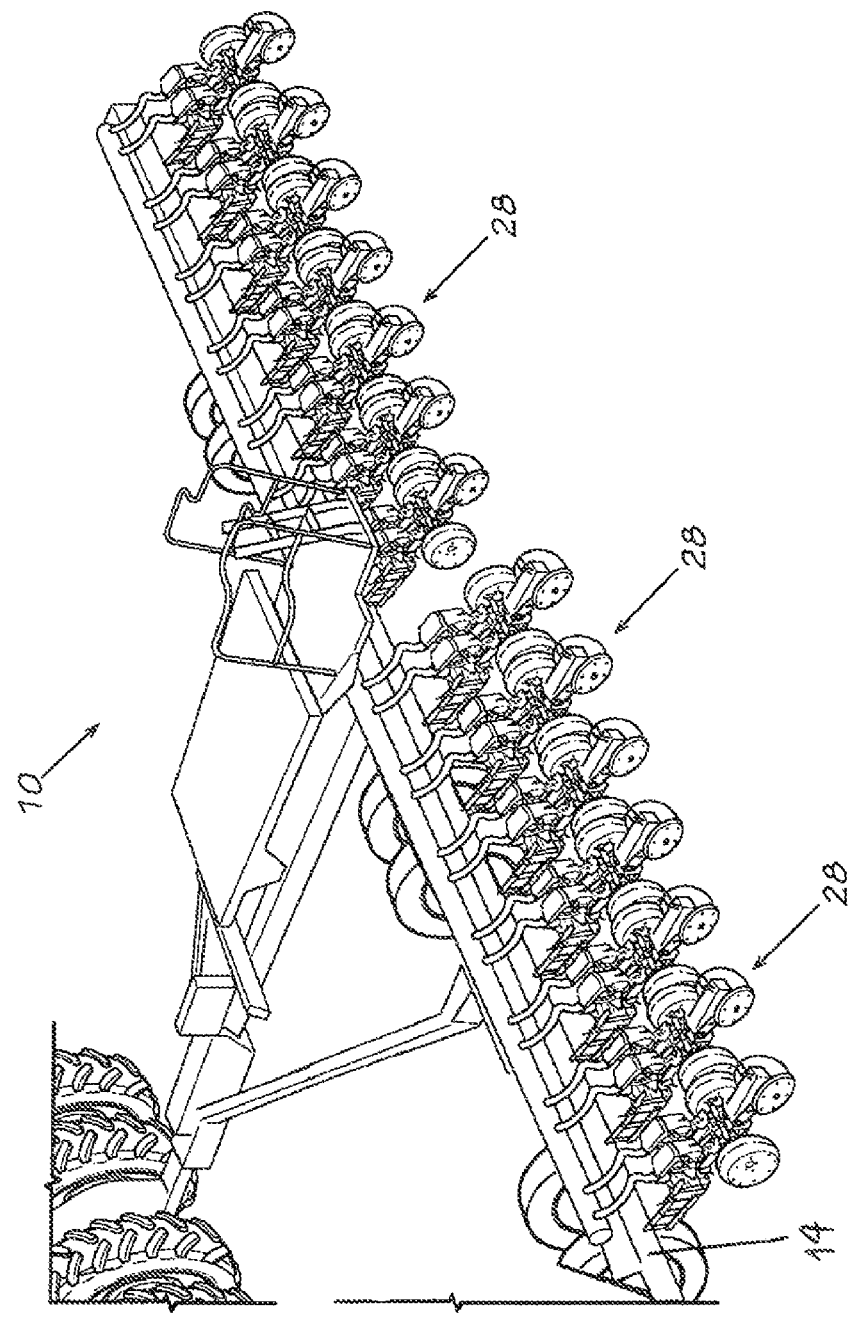
FIG. 1 is a left perspective view of a planter employing multiple dual row planter units incorporating the principles of the present invention.
Figure 2:
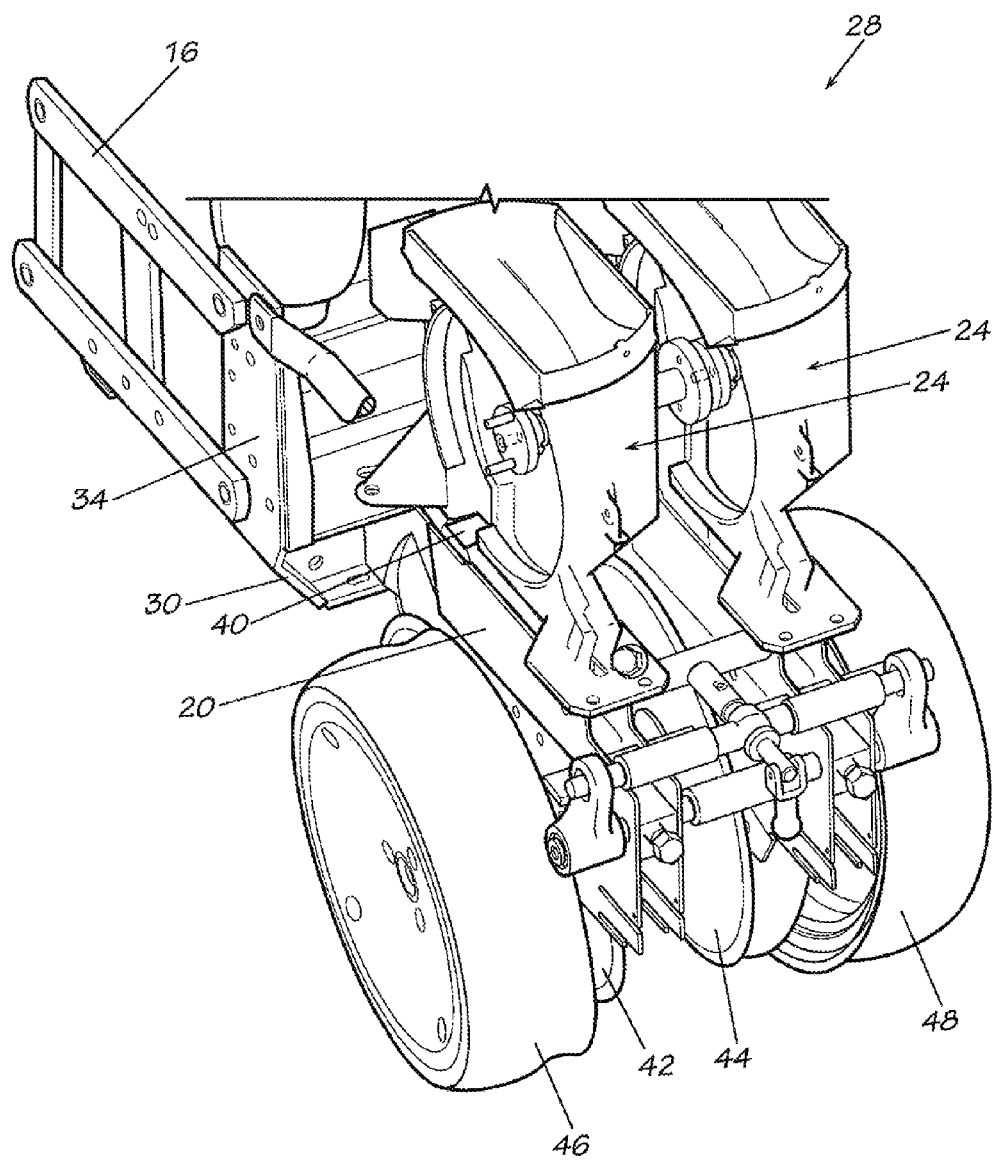
FIG. 2 is a rear view from above of showing a fragmentary view of a dual row planter unit of FIG. 1 according to the present invention.
Figure 3:
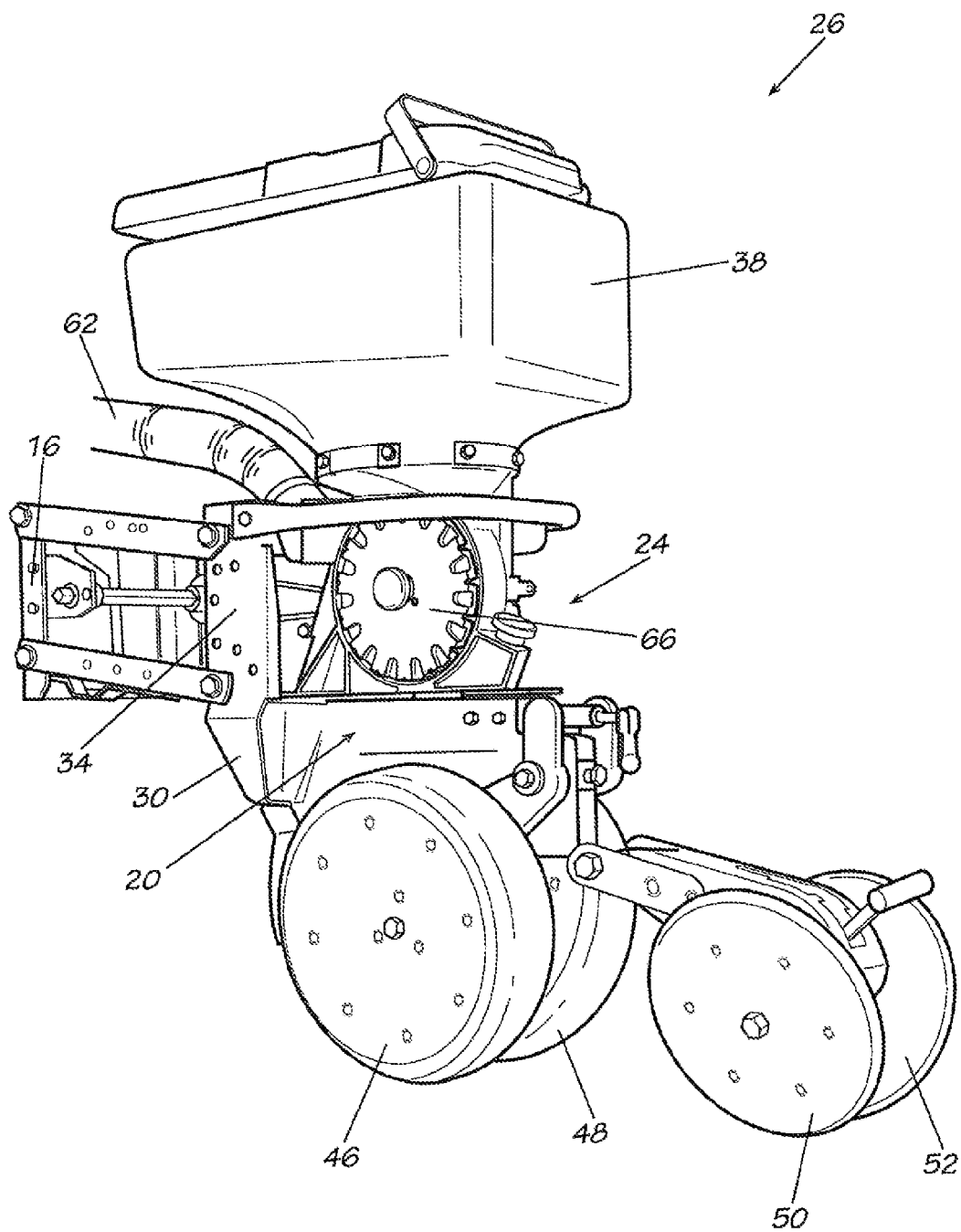
FIG. 3 is a front perspective view of a single row planter unit according to the present invention.

FIG. 1 illustrates a planter 10 having a plurality of planting units attached to a tool bar 14 or other frame member of the machine. As well understood by those skilled in the art, planter 10 may be adapted for mounting on the three point hitch of a tractor or may comprise a pull-type implement with its own set of transport wheels. Each planting unit includes some suitable means for attaching the unit to tool bar 14. In FIGS. 2 and 3, such attachment means comprise a four-bar linkage 16 and a pair of U-bolts (not shown) for fastening the linkage 16 to the tool bar 14. Each planting unit further broadly comprises a fore-and-aft lower frame 20 attached to and projecting rearwardly from linkage 16, the frame 20 having a number of components mounted thereon as hereinafter explained.

The planting units in one or more embodiments of the present invention may have multiple input meters 24 on the same planting unit. For example, a planting unit may be either a single row planting unit 26 or a dual row planting unit 28. A dual row unit 28 includes the lower frame 20 and a pair of singulating input meters 24 indexed together as best shown in FIG. 2. The meters 24 of a twin row planting unit 28 are mechanically indexed together or may be controlled separately with electronics and sensors. Therefore, each dual row planting unit 28 may plant one or more furrows or lines of seed. A single row planting unit 26 with a single input meter 24 is shown in FIG. 3. The lower frame 20 of each planting unit 26, 28 includes what is commonly referred to as a horse collar 30 for further securing the planting units 26, 28 to the tool bar 14 and for protecting the meters 24. Each horse collar 30 includes upward extending and opposite facing portions 34, 36 that are sufficiently laterally spaced apart from one another depending on whether it is part of a single row planting unit 26 or a dual row planting unit 28.

The planting units 26, 28 may be powered or driven by individual mechanical, electrical, hydraulic or pneumatic motors. One or more planting units 26, 28 may be driven by a common motor. For example each planting unit 26, 28 may be powered by a hydraulic drive or motor that powers the main line shaft of the planter 10. Alternatively, the planting units 26, 28 may be driven by a transmission where the planter's wheels contacting the ground drive the main line shaft. However, the hydraulic drive is preferred when variable rate seeding is desired because it is independent of ground speed. The seeding rate may be varied by varying the flow of hydraulic fluid.

For each input meter 24, the lower frame 20 of the planting unit 26, 28 carries a generally upright dispensing tube 40 that is visible in FIGS. 2, and 4-6 and is adapted for receiving inputs such as seeds from one of the meters 24 disposed above dispensing tube 40 on frame 20. The meter 24 receives seeds from a source of supply, such as a seed box or hopper 38 also mounted on lower frame 20 above the meter 24. Seeds that are received by the meter 24 from the hopper 38 are singulated and dropped through dispensing tube 40 for deposit into the ground as planter 10 advances.

A suitable furrow opener may also be carried by frame 20 for opening a furrow in the soil for receiving seeds dropped through dispensing tube 40. The furrow opener may take a variety of different forms. For example, the furrow opener may take the form of a double-disc opener having a pair of downwardly and slightly forwardly converging discs 42, 44 rotatably mounted on lower frame 20. Dispensing tube 40 projects downwardly between discs 42, 44 and has a lower discharge end facing generally rearwardly and downwardly to discharge the seeds into the furrow.

A pair of ground-engaging gauge wheels 46 and 48 is disposed on opposite sides and is rotatably mounted on frame 20 to provide support for frame 20 and to limit the depth of penetration of the furrow opener into the ground. As frame 20 can swing up and down relative to tool bar 14 via the four-bar linkage 16, the downward movement is limited by gauge wheels 46, 48 as they roll along the ground during operation. In the illustrated embodiment, a pair of closing wheels 50, 52 is attached to the rear of frame 20 and function in a known manner to close the seed furrow after seeds have been deposited therein by dispensing tube 40. The vertical position of gauge wheels 46, 48 relative to frame 20 and furrow discs 42, 44 can be adjusted.

Preferably the meters 24 are pneumatic such that low pressure air flow enters through air inlet 60 in the meter 24. The meters 24 are sometimes referred to as air seed meters. Air flow for all the meters 24 of a planter 10 may be generated by a single variable speed hydraulically powered fan centrally positioned on the planter 10, or alternatively, an individual fan dedicated to and preferably coupled to each meter 24. FIGS. 1 and 3 best illustrate air lines 62 for providing air to the air inlet 60 of the meters 24 from a central fan.

Each meter 24 includes a rotating metering disc 66 that has a plurality of input pockets such as seed pockets 68 on one side for retaining one or more seeds. The seed pockets 68 are positioned on the inside surface of the metering disc 66 when the metering disc 66 is positioned in the meter 24. The seed pockets 68 communicate with the outer periphery of the circumference of the metering disc 66. All metering discs 66 are preferably manufactured with the same pin position (index).

Figure 14:
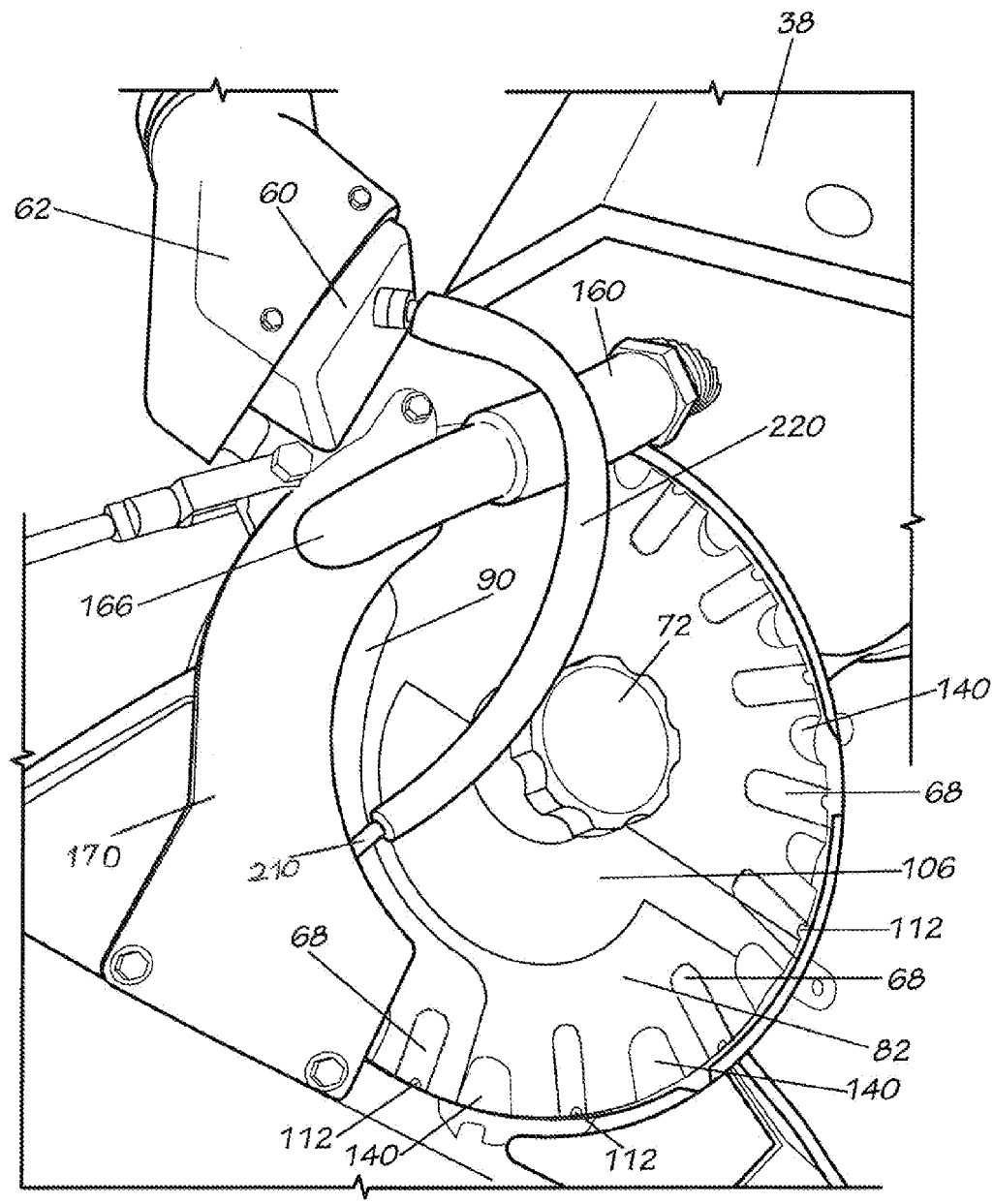
FIG. 14 is a perspective view of the fertilizer transfer chamber of FIGS. 11 and 12 mounted to the meter.
Figure 15:
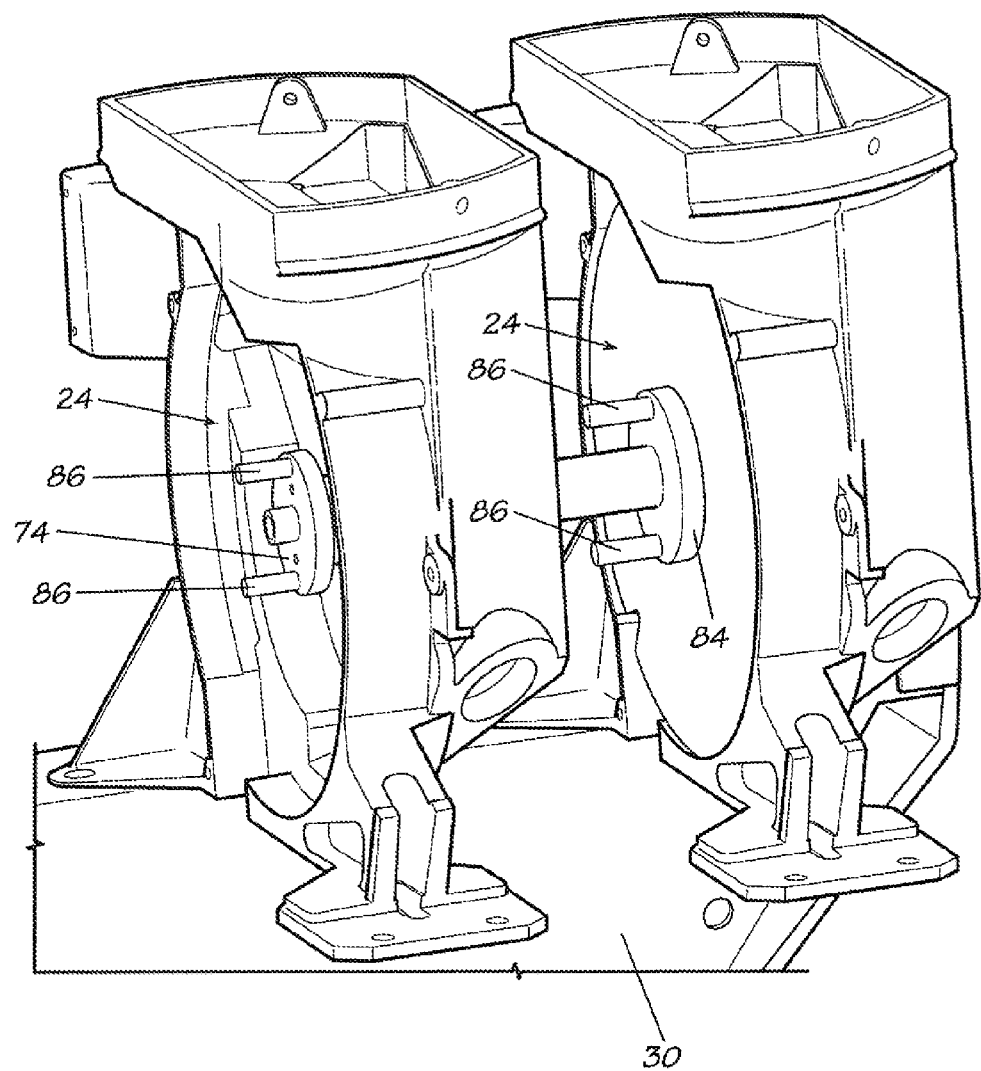
FIGS. 15 and 16 are a perspective view of side by side meters with a common axle assembly.

A different metering disc 66 may be used for each type of input such as different types of crops. To change from one crop to another, a retaining knob 72 is removed so that the desired metering disc 66 can be attached to a hub 74 of an axle 76. The metering disc 66 is preferably transparent so that the seed pockets 68 on the interior side of the metering disc 66 can be seen through the metering disc 66 when the metering disc 66 is attached to the hub 74. However, in the illustrations only FIG. 14 shows the metering disc 66 as being transparent.

Figure 4:
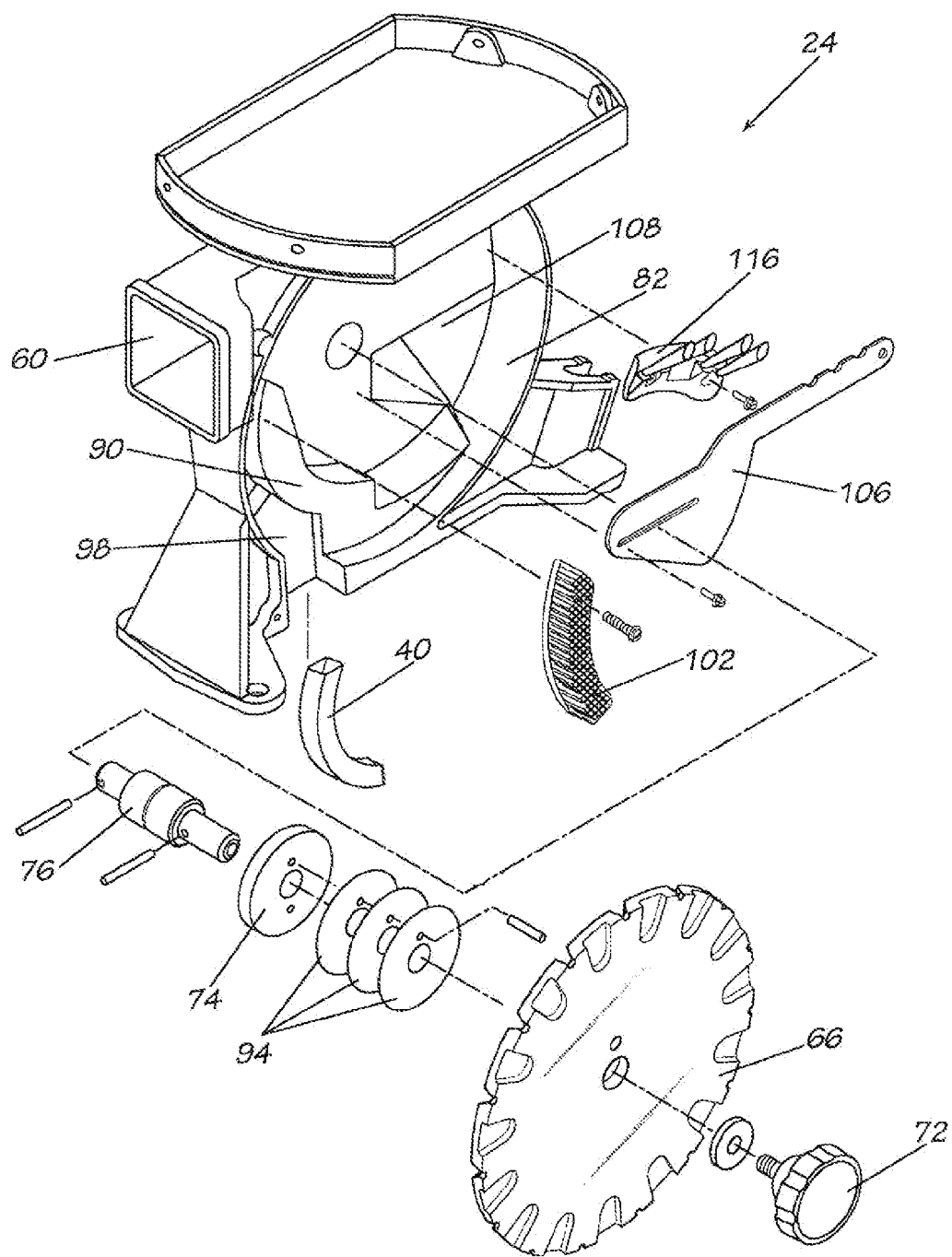
FIG. 4 is an exploded view of a meter of the single row and dual row planter units according to the present invention.
Figure 5:
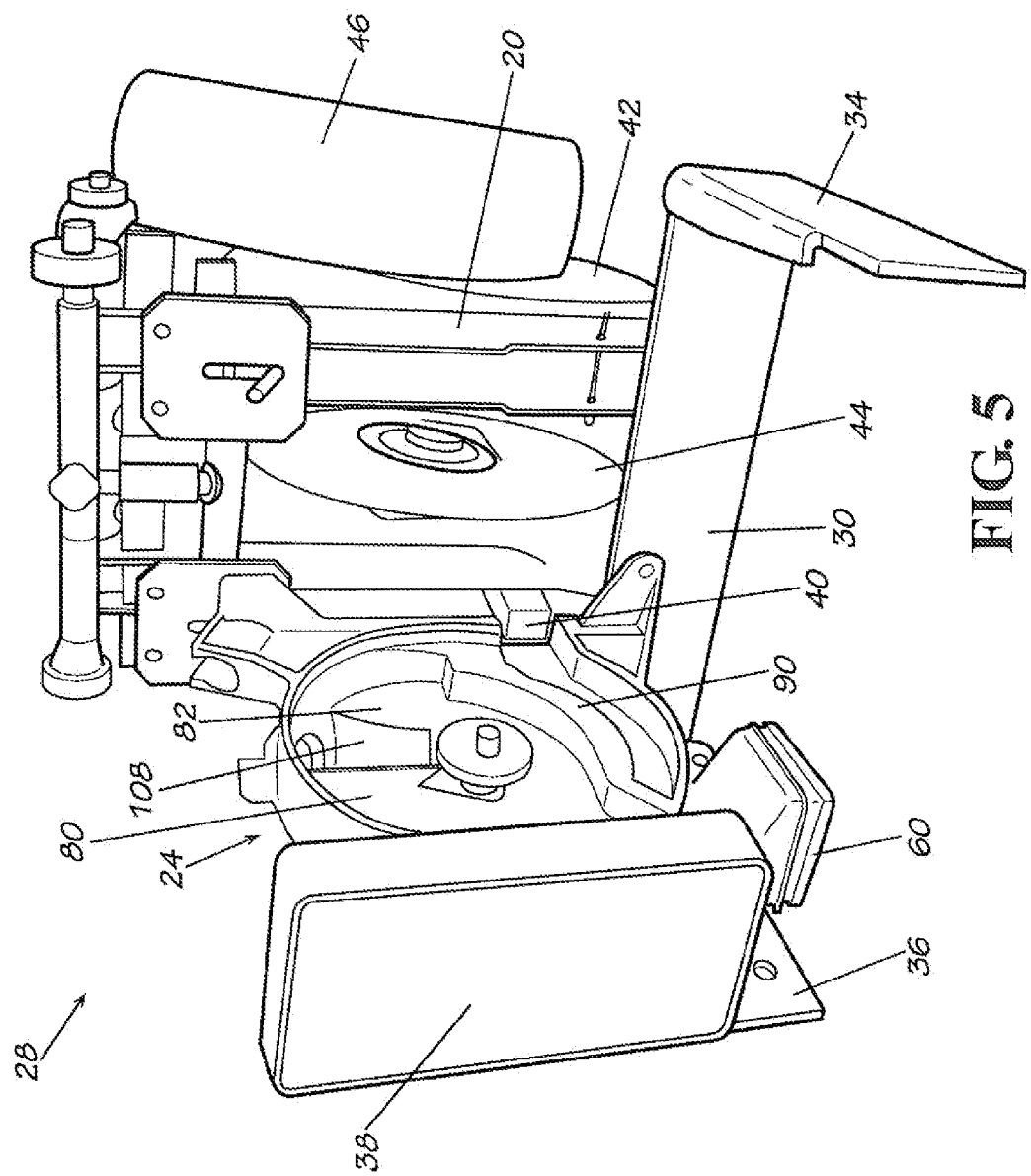
FIG. 5 is a top view of the dual row planter unit of FIG. 2 with one of the meters removed according to the present invention.

As best shown in FIG. 4, the hub 74 is coupled to the axle 76 corresponding with the axis of rotation of the metering disc 66 rotating in the meter 24. Preferably the pair of meters 24 of a dual row planting unit 28 is axially aligned with one another so that a single elongated shaft or a combination of axially aligned shafts may extend between the two meters 24 as best shown in FIG. 2. However, in the event that the two meters 24 are not positioned side by side in axial alignment, for example one could be positioned slightly forward of the other, then separate axles 76 are required. In such case, the two axles 76 having axes of rotations that are in parallel misalignment with one another may be driven together with a sprocket and a belt or chain or some other mechanism. The metering discs 66 of a pair of meters 24 of a dual row planting unit 28 are indexed relative to one another such that the seed pockets 68 of one metering disc 66 corresponds with the seed pockets 68 of the other metering disc 66 as both metering discs 66 rotate in their respective meters 24. Alternatively, the two metering discs 66 could be indexed relative to one another such that the seeds in adjacent rows are offset from one another.

The positive air flow into the meter 24 through air inlet 60 and through opening 78 creates a pressurized metering chamber 80 between the inside of the metering disc 66 and the meter 24. A portion of the chamber 80 defines a seed sump 82 for receiving and collecting a portion of the seeds from the hopper 38. An air cutoff shelf 90 extends through the chamber 80 to the periphery of the metering disc 66 above the dispensing tube 40. The cutoff shelf 90 has a radial thickness sufficient to exclude most of the positive airflow from passing between the outwardly extending surface of the cutoff shelf 90 and the inner surface of the metering disc 66. Shims 94 may be used between the metering disc 66 and hub 74 so that the metering disc 66 is permitted to rotate and that only a nominal amount of drag exists between the inner surface of the metering disc 66 and the outwardly extending exterior surface of the cutoff shelf 90. The number of shims 94 used can determine the amount of air allowed to pass over the cutoff shelf 90. In front of the cutoff shelf 90 is a discharge area 98 where the seeds from the seed pockets 68 of the metering disc 66 are dropped into the dispensing tube 40. Also positioned in front of the cutoff shelf 90 is an air cutoff brush 102. Both the discharge area 98 and the cutoff brush 102 correspond with the seed pockets 68 along the periphery of the metering disc 66 as they rotate.

A sliding seed gate 106 controls the seed level in the seed sump 82 of the meter 24 for precise metering of a wide range of seed sizes from the hopper 38 through a variably sized opening 108 into the chamber 80. As the metering disc 66 rotates in a counter-clockwise manner, seeds are collected in the seed pockets 68. The seeds are held in each seed pocket 68 by the positive air pressure pushing on the seeds. The seed pockets 68 also at least partially define an opening 112 extending from each of the seed pockets 68 to the opposite side of the metering disc 66. When the metering disc 66 is in the meter 24 the openings 112 are partially defined by the seed pockets 68 and, because the portion of the openings 112 defined by the metering disc 66 itself are positioned along the edge on the circumference of the metering disc 66, the openings 112 are also partially defined by the casting of the meter 24 itself as it surrounds the circumference of the metering disc 66. However, the openings 112 may instead be completely defined within the seed pockets 68 and extend through the thickness of the metering disc 66. However, in one or more embodiments a vacuum may instead be used to retain the seed in its pocket 68.

When a seed advances around the meter 24 in a seed pocket 68, excess seeds are removed from each seed pocket 68 when the seed pocket 68 with excess seeds reaches a tickler brush 116. As the seed continues to advance around the meter 24, the air cutoff brush 102 gently shuts off the air to the seed in each of the seed pockets 68 corresponding with the cutoff brush 102 and holds each seed in place in its seed pocket 68 until reaching the bottom of the metering disc rotation and is released down the dispensing tube 40.

Because pneumatic seed metering systems which use air pressure or a vacuum to hold the seed in place in the seed pocket 68 on the metering disc 66 the seeds may not always be released at the desired dispensing point into the discharge area 98. Also, any delay in the release of the seed will translate into unequal seed spacings or even a skip (when no seed is released). The cause of such a delayed release may be because of coatings, humidity static electricity or non-uniform seed lots for example. Also, meters which use positive pressure in the metering chamber may have a varying air pressure as a result of the size of the planter and seed lot. Air pressure varying in the range of three to four psi is not uncommon.

Figure 6:
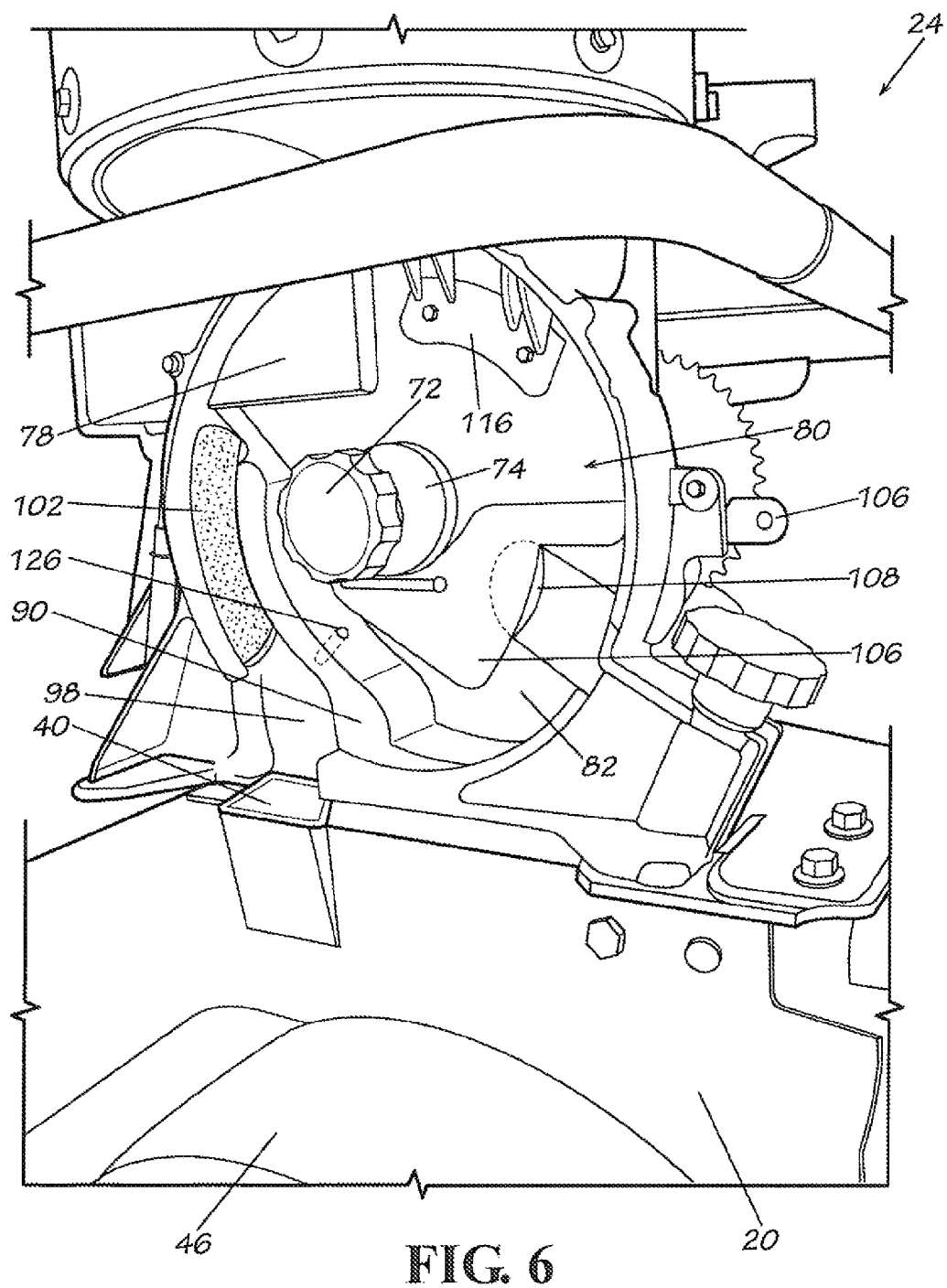
FIG. 6 is a right side perspective view of a meter with a metering disc removed according to the present invention.
Figure 7:
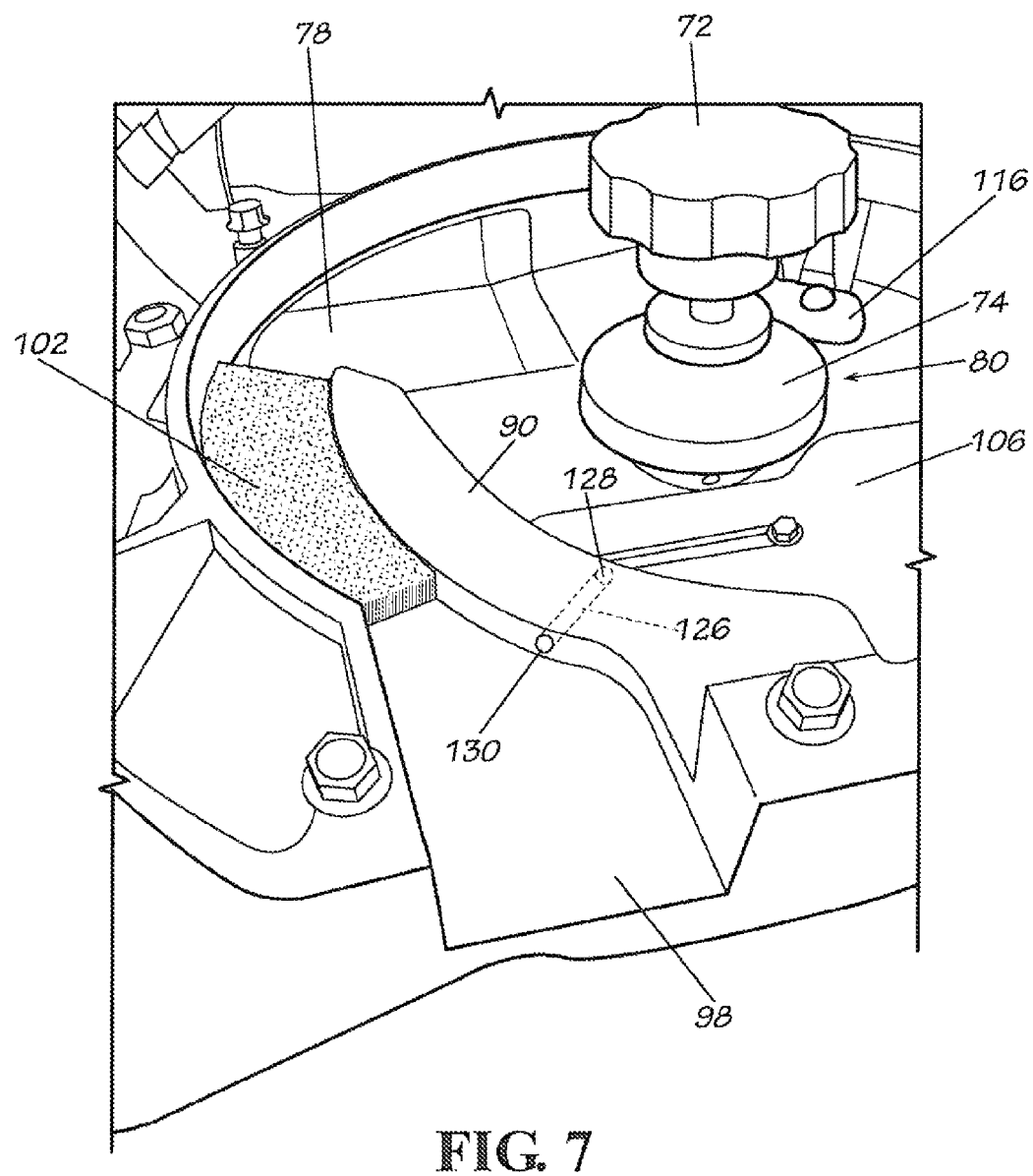
FIG. 7 is a close-up bottom view from the left of the meter of FIG. 6.

Although the air cutoff shelf 90 eliminates air flow to the seed pockets 68 with seeds as they rotate in front of the cutoff shelf 90, a flow of directed air across the metering disc 66 at the dispensing point may be used to assist the seed falling out of the seed pocket 68 and into the discharge area 98 and into the dispensing tube 40. An air passage 126 may be positioned through the thickness of the cutoff shelf 90. The passage 126 is preferably formed into the meter's casting in a way that allows a small stream of air from the pressurized side of the chamber 80 to blow across at the seed release point in the discharge area 98 above the dispensing tube 40. As best shown in FIGS. 6 and 7, an air inlet 128 of the passage 126 is positioned on one side of the cutoff shelf 90 adjacent the seed sump 82 and an air outlet 130 of the passage 126 is positioned on the opposite side adjacent with and communicating with the discharge area 98. A tube may be positioned in the passage 126.

Alternatively, instead of utilizing the air from the metering chamber 80, a different air source could be used to provide the directed air at the release point through the passage 126 or through a different opening or air passage directed toward the release point. The alternative air source could be directly from the air lines 66 from the central fan before the air enters the metering chamber 80 of the meter 24 or a separate dedicated air source such as a dedicated fan could be utilized. If an independent air source is utilized, the air flow may be varied. The air flow could be adjusted independently of the air flow of central fan and air line system. For example, the air flow could be pulsed. The dedicated fan could be toggled between off and on to generate the pulsed air flow, or all or part of an obstruction could be intermittently placed in or over the passage 126 to prevent air from passing through the passage 126 from the pressurized metering chamber 80, and be timed to correspond with when the seed is to leave the seed pocket 68. The air flow could also be accelerate or decelerate the seed traveling through the discharge area 98 or the dispensing tube 40. In one embodiment, the periphery of the metering disc 66 could be part or all of the obstruction as it rotates over the passage 126. Thus, the exit velocity of the seed from the dispensing tube 40 could be matched with the forward speed of the planter 10.

Figure 8:
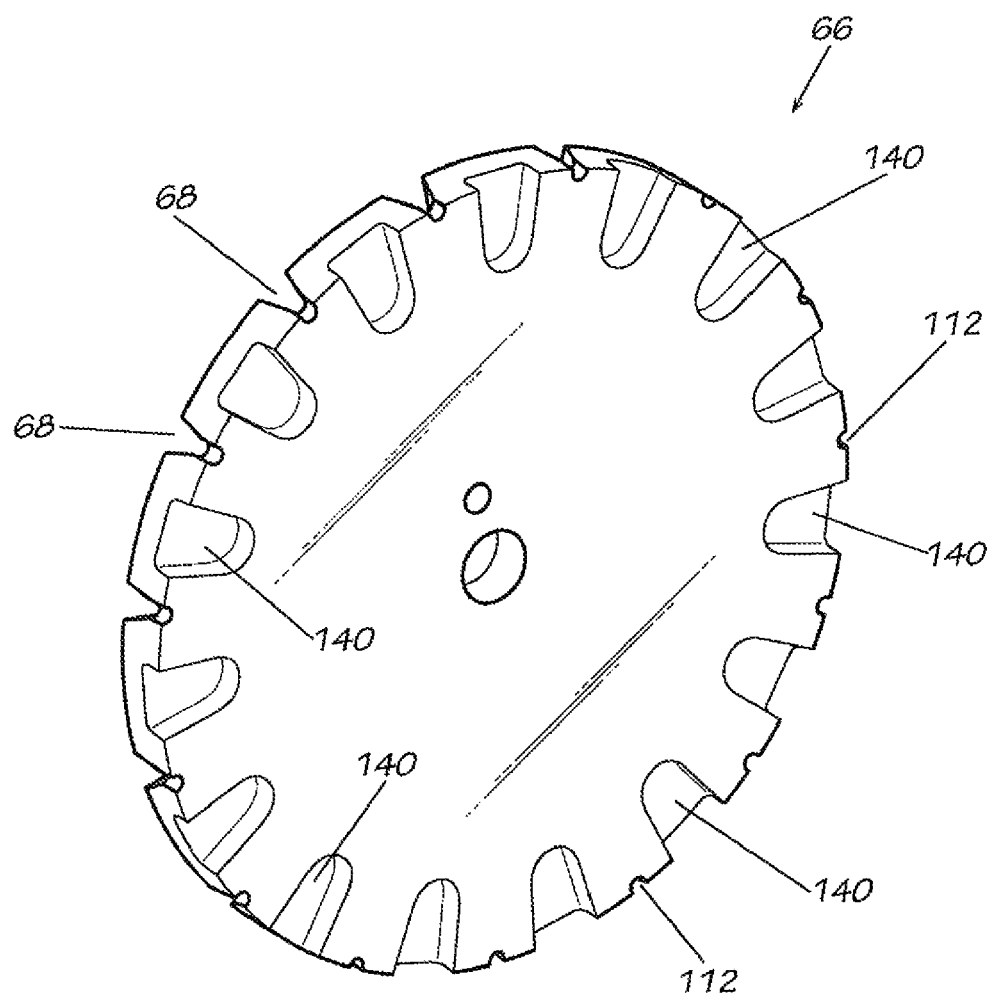
FIG. 8 is a perspective view of one side of a metering disc according to the present invention.
Figure 9:
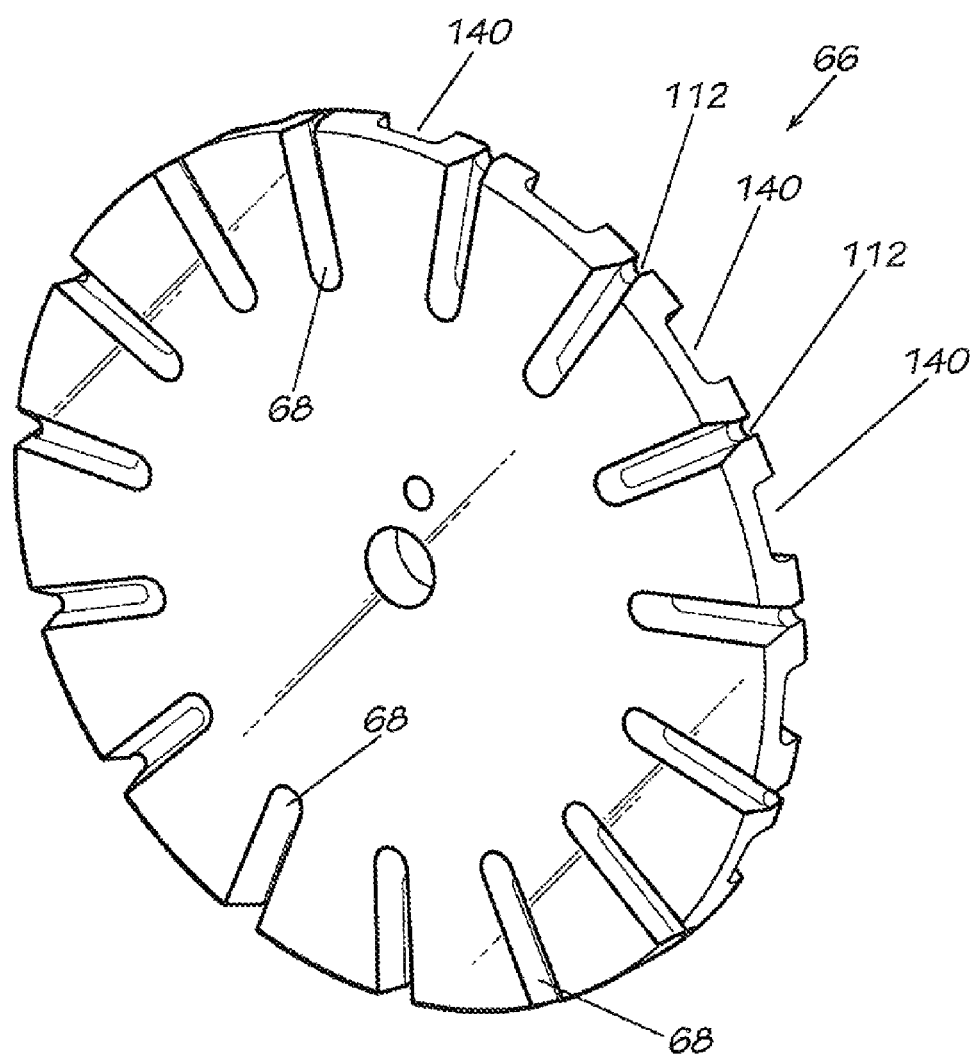
FIG. 9 is a perspective view of the opposite side of the metering disc of FIG. 8.

In one or more embodiments the metering disc 50 may include a second plurality of input pockets 140. Therefore, two or more crop inputs may be metered and dispensed per dispensing point with a single metering disc 66. In one embodiment, seeds may be dispensed from pockets on both sides of the metering disk 66. The seeds in the pockets 68 may be the same or different from the seeds in pockets 140. In another embodiment, the input pockets 140 may be utilized for receiving and dispensing fertilizer from the opposite side of the metering disc 66 having the seed pockets 68 as best shown in FIGS. 8 and 9. In a common furrow both seed and fertilizer may be used while keeping the fertilizer segregated from the seed in the soil. A precision application dual product seed meter places concentrated amounts of fertilizer at approximately equal distances between seeds within a seed furrow and/or between seed furrows. The meter 24 dispenses both seed and fertilizer using the same metering device to achieve precision equal distance placement of fertilizer (plant nutrients) and seed. The rows may be evenly spaced or irregular including two or more rows closely spaced with alternating wider row widths for seasonal application of crop inputs and harvesting.

Air pressure is preferably used to singulate and dispense seeds on one side of the metering disc 66 while the fertilizer is measured and metered by gravity on the opposite side of the metering disc 66. The placement of the seed and fertilizer pockets 68, 140 in relation to each other insures the two inputs are dispensed precisely and separately. The metering disc 66 with the fertilizer pockets 140 may dispense dry granulized or pelletized fertilizer. Also, the fertilizer products may be wet (liquid) or dry, and include seed. In some embodiments, air pressure or vacuum to meter both inputs may be used with the appropriate size and shape fertilizer granules or nuggets.

The fertilizer pockets 140 are positioned on the exterior surface of the metering disc 66 when the metering disc 66 in positioned in the meter 24. The fertilizer pockets 140 also communicate with the outer periphery of the circumference of the metering disc 66. However, the seed pockets 68 and the fertilizer pockets 140 are spaced on the metering disc 66 along its circumference such that the seed pockets 68 and fertilizer pockets 140 alternately communicate with the outer periphery along circumference of the metering disc 66. The pockets 68 and 140 on opposite sides of the metering disc 66 are offset circumferentially from one another so that only one product at a time is dispensed as the metering disc 66 rotates past the discharge area 98 with the products alternating between seed and fertilizer. This results in equidistant spacing between seed and fertilizer within the same furrow.

The openings 112 extending from each of the seed pockets 68 do not communicate with the fertilizer pockets 140. The openings 112 are spaced in between the fertilizer pockets 140. A different metering disc 66 may be used for each type of fertilizer as well as crop. Therefore, the seed pockets 68 and fertilizer pockets 140 are shaped differently depending on whether they are configured to have seeds or fertilizer as well as for obtaining the desired amounts of each in each pocket 68, 140.

Figure 10:
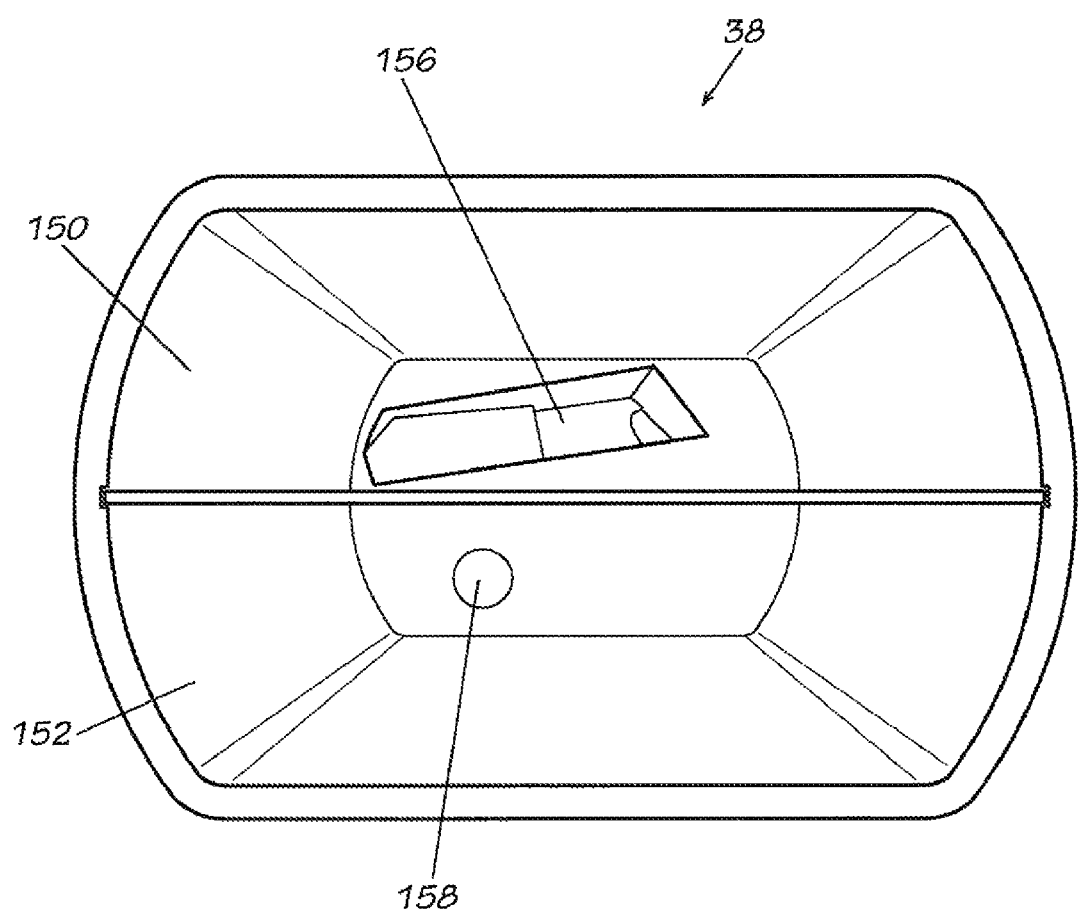
FIG. 10 is a top view of the inside of a partitioned hopper according to the present invention.

When dispensing both seed and fertilizer from the same meter 24, it is preferable to have a partitioned hopper 38 having a first chamber 150 for seeds and a second chamber 152 for fertilizer as best shown in FIG. 10. The first chamber 150 for seeds is pressurized with air from the meter 24 and gravity feeds the seeds to the seed sump 82 of the meter 24. The second chamber 152 for the fertilizer is not pressurized. The volume of each chamber of the hopper 38 relative to one another depends on the amount of fertilizer needed for each seed. However, the seeds and fertilizer may instead be dispensed from a pair of separate hoppers, coupled to the meter 24, holding one or the other of the seeds and fertilizer. The seeds and fertilizer may instead be dispensed from one or more hoppers centrally positioned elsewhere on the planter 10. The first chamber 150 for seeds has an opening 156 in the bottom for dispensing seeds to the opening 108 of the meter 24 and into the seed sump 82 behind the metering disc 66. The second chamber 152 has an opening 158 for dispensing fertilizer to the fertilizer pockets 140 on the exterior of the metering disc 66.

The fertilizer is dispensed from the second chamber 152 of the hopper 38 by gravity through a tube 160 fastened to the opening 158 of the second chamber 152 of the hopper 38 and to an upper inlet passage or tube 166 in an exterior side of a fertilizer transfer chamber assembly 170 where a metering disc-facing channel 172 faces the exterior of the metering disc 66. The tube 166 coupled to the tube 160 communicates through the transfer chamber assembly 170 into the channel 172. The transfer chamber assembly 170 is somewhat arcuate in that when it is coupled to the meter 24 it corresponds with a portion of the outer circumference of the metering disc 66 along its exterior periphery. Therefore, the fertilizer pockets 140 correspond and communicate with the channel 172 as the metering disc 66 rotates in the meter 24. As the fertilizer falls through the tubes 160, 166 and into the channel 172 of transfer chamber assembly 170 the fertilizer is received from the channel 172 into the fertilizer pockets 140.

The transfer chamber assembly 170 may include a flexible material such as a holding portion or pad 178 along a portion of its length below where the tube 166 opens into the channel 172 and extending to a point where the holding pad 178 terminates at or just above the discharge area 98 of the meter 24 when the transfer chamber assembly 170 is operatively coupled to the meter 24 adjacent the metering disc 66. The holding pad 178 is preferably dense foam rubber designed for impact absorption to hold the fertilizer in the fertilizer pockets 140 of the metering disc 66 until discharged. However, the holding pad 178 may be made from any suitable such as plastics, urethanes, and vinyl, for example. A lowermost portion of the channel 172 is preferably left unobstructed by the holding pad 178, defining a channel outlet 180 shown in FIGS. 12 and 13, which would correspond with the discharge area 98 and fertilizer pockets 140 with fertilizer above the dispensing tube 40.

Also, the channel 172 may include a deflector such as a wiper strip 188 adjacently above the holding pad 178. The wiper strip 188 is preferably made of urethane or some other suitable material to deflect rather than grind the fertilizer and to extend the life of the metering disc 66 and wiper strip 188. As the metering disc 66 continues to rotate, the seed pockets 68 and the fertilizer pockets 140 alternately communicate with the discharge area 98 so that both the seeds being dispensed from the seed pockets 68 on the interior of the metering disc 66 and the fertilizer being dispensed via gravity from the fertilizer pockets 140 on the exterior of the metering disc 66 are both dispensed to the discharge area 98 and both go down the same dispensing tube 40. However, because the seed pockets 68 and fertilizer pockets 140 are alternately spaced along the circumference of the metering disc 66, the seeds and fertilizer take turns falling down the dispensing tube 40.

Figure 11:
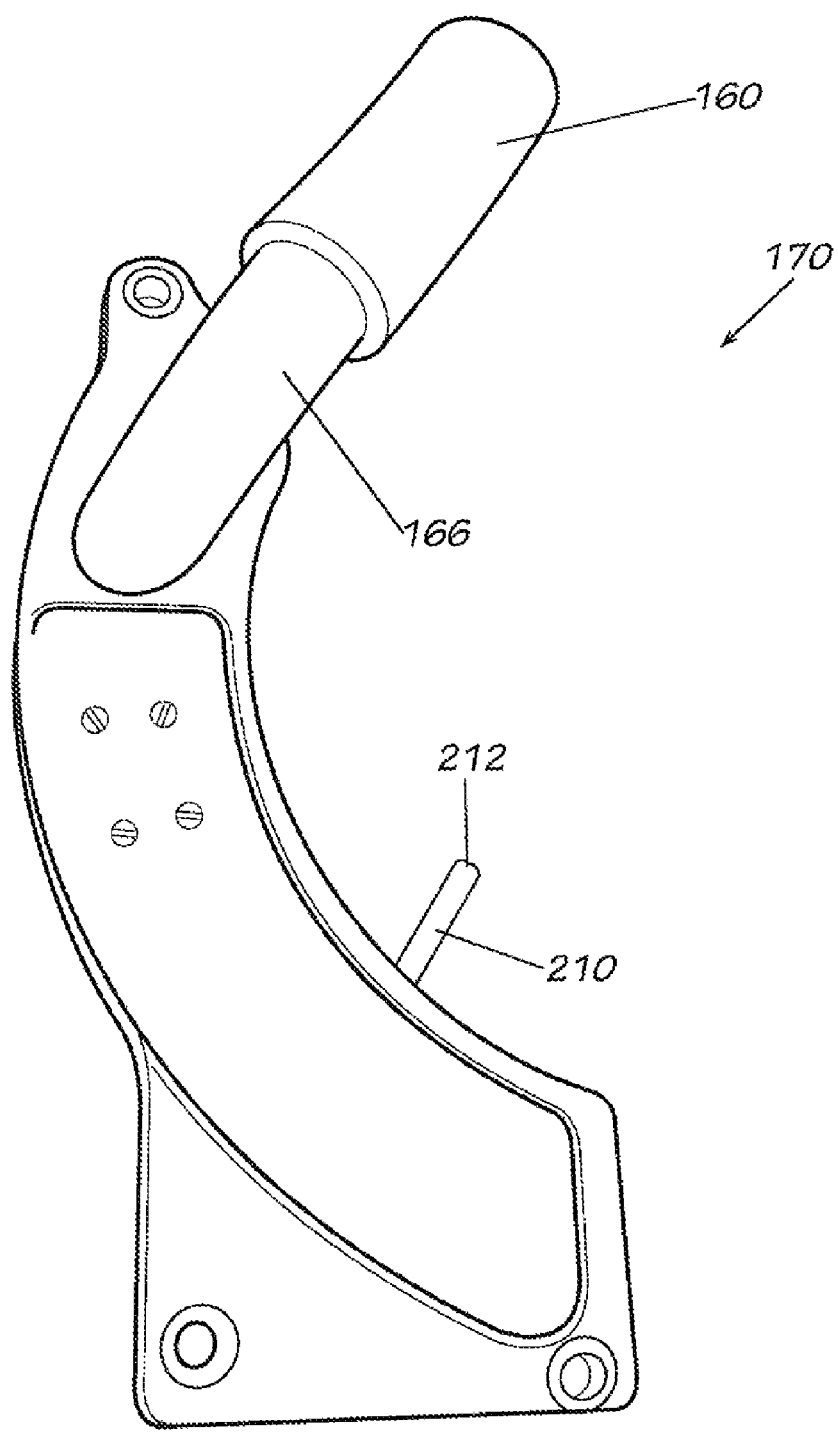
FIG. 11 is a side view of a fertilizer transfer chamber according to the present invention.
Figure 12:
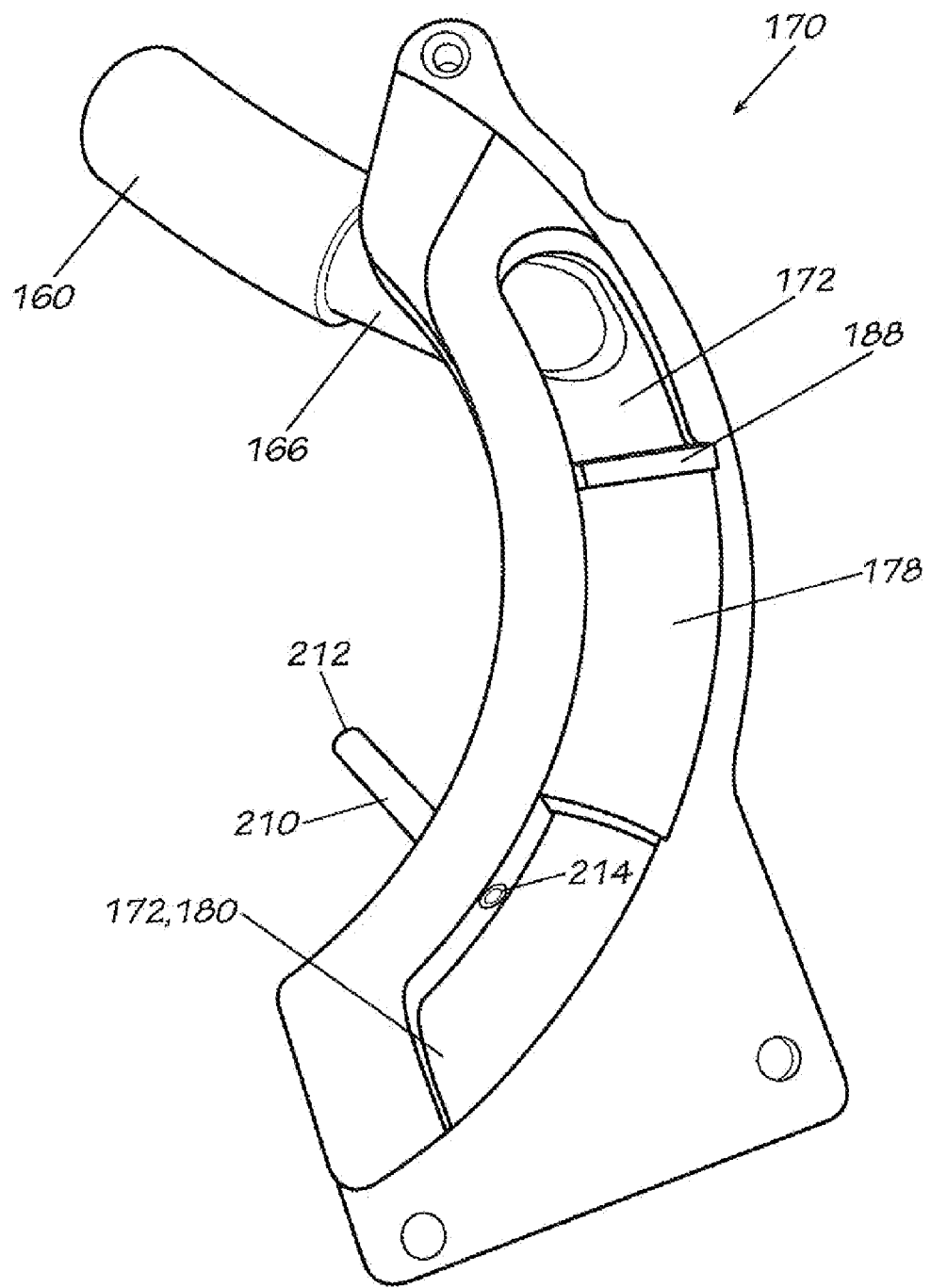
FIG. 12 is an opposite side view of the fertilizer transfer chamber of FIG. 11.

FIGS. 11 and 12 illustrate a tube or air passageway 210 passing from the exterior side of the transfer chamber assembly 170 to the channel 172. The passageway has an inlet 212 and an outlet 214. Directed air flow from the outlet 214 assists the fertilizer from fertilizer pockets 140 and into the discharge area 98. The air flow from the outlet 214 may be from an air source such as from the pressurized side of the metering chamber 80 or from elsewhere. Alternatively, instead of utilizing the air from the metering chamber 80 or air delivered from the central fan and air line system, a different air source could be used to provide the directed air against the fertilizer at the release point through the passageway 210 or through a different opening or air passage directed toward the release point. The alternative air source could be a separate dedicated air source such as a dedicated fan which would allow the air flow to the fertilizer to be varied. The air flow could be adjusted independently of the air from the central fan or from the air line system. For example, the air flow directed at the fertilizer in pockets 140 could be pulsed. In another example, the air flow from one or more sources could pulse in an alternating manner such that pulsed air is toggled back and forth between the seeds in pockets 68 and the fertilizer in pockets 140. The dedicated fan could be toggled between off and on to generate the pulsed air flow, or all or part of an obstruction could be intermittently placed in or over the passage 210 to prevent air from passing through the passage 210, and be timed to correspond with when the fertilizer is to leave the fertilizer pocket 140. The air flow could also be accelerate or decelerate the fertilizer traveling through the discharge area 98 or the dispensing tube 40. Thus, the exit velocity of the fertilizer from the dispensing tube 40 could be matched with the forward speed of the planter 10.

Figure 13:
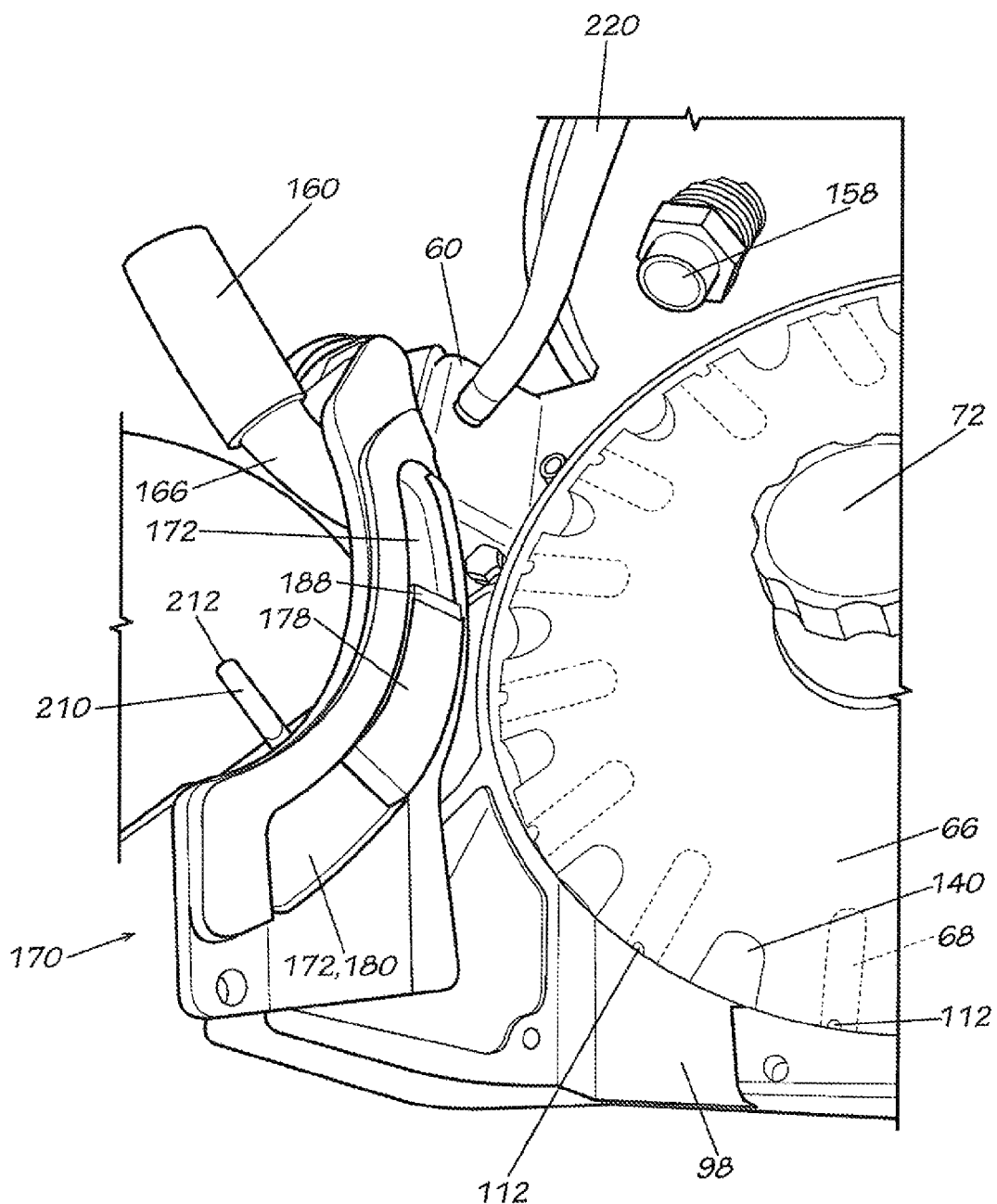
FIG. 13 is a perspective view of the fertilizer transfer chamber of FIGS. 11 and 12 placed in proximity to its mounting location to the meter.

As best shown in FIGS. 13 and 14, air flow is directed on the fertilizer in the pockets 140 at the discharge point corresponding with the discharge area 98 above the dispensing tube 40. This air flow is provided from an air line 62 from of the central fan and air line system. The air line 62 is coupled to the air inlet 60 to the meter 24 and one end of a tube 220 can also be coupled to the air inlet 60 of the seed meter 24. The other end of the tube 220 is coupled to the inlet 212 of the passageway 210 of the transfer chamber assembly 170. Preferably, the metering disc 66 is transparent and, in regard to FIG. 14, the elements visible behind the transparent seed disc 66, in particular the air cutoff shelf 90, the seed gate 106, and the seed pockets 68, are shown in light, full lines, rather than broken lines.

At certain combinations of seed populations and row spacings and planter unit dispense point offsets, the fertilizer is equal spaced with seed in a furrow and an adjacent furrow. When two or more planter units are driven with a common drive, the dual product metering discs 66 may be positioned relative to each other so as to optimize equal spaced fertilizer with nearest neighbor seeds. To obtain the proper equal distant fertilizer spacing with the seed in adjacent twin rows it is necessary to have a rotational adjustment capability between the meters 24 to synchronize the dispensing of inputs of both metering discs 66 of the dual row planting unit 28. When the meters 24 of a planting unit are offset from one another, both meters 24 can be driven by sprockets with chain adjustments or rotating the axle 76 of one slave meter 24 relative to a master meter 24. For example, the slave meter 24 is positioned eight and a half inches behind and seven and a half inches to the side of the forward metering unit 24 on each dual row planting unit 28. The metering disc 66 of the first meter 24 may be connected by sprockets and chains to a common axle driven by a single hydraulic motor of the planter 10. The second meter 24 is connected to the first meter 24 with a chain and same size sprocket.

Figure 16:
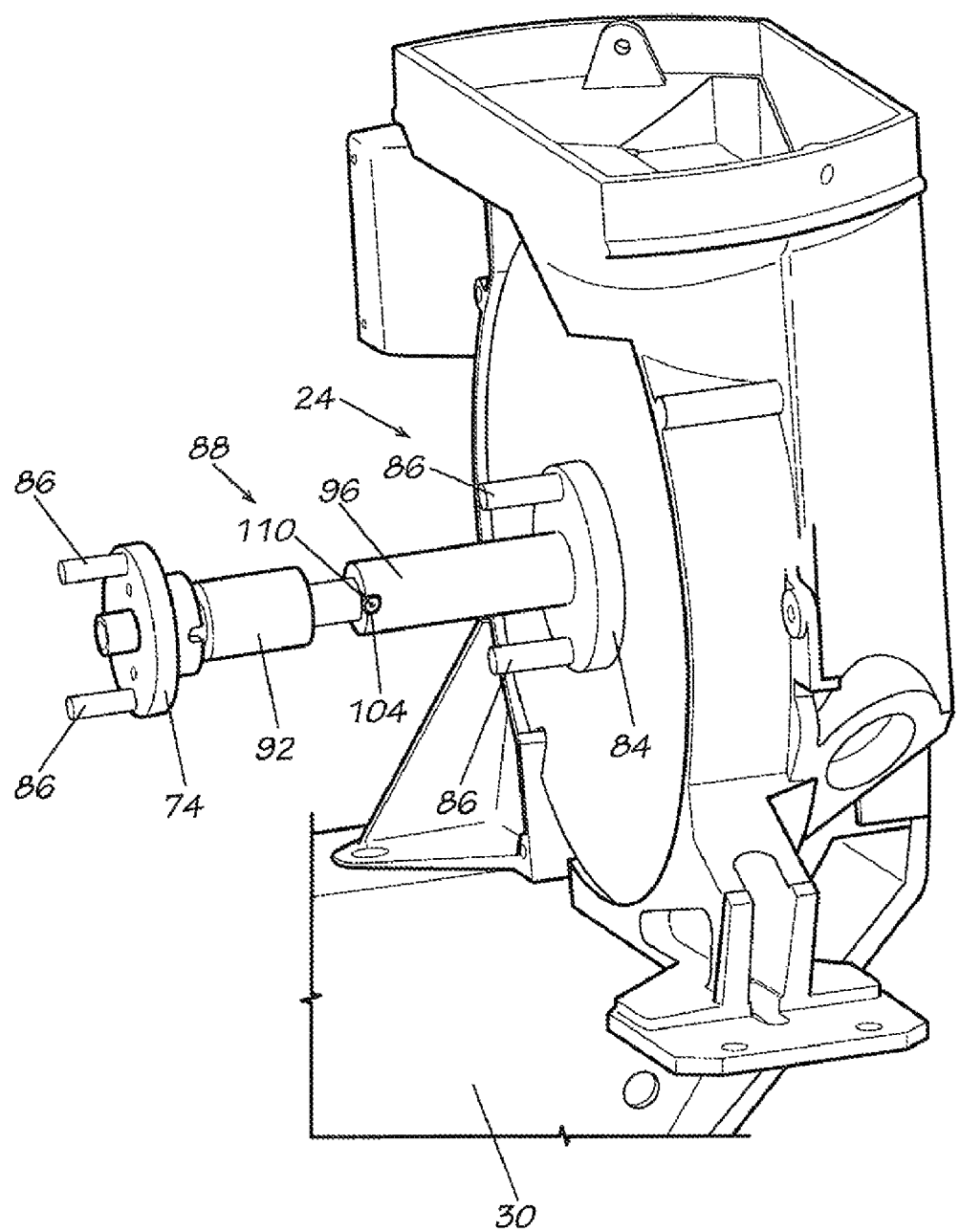

When the axes of rotation of the metering discs 66 of a dual row planting unit 28 are aligned perpendicular to the direction of travel of the planter 10 and for planting more than one row of a crop, the positional relationship of the first input relative the second input in adjacent rows metered from metering disc 66 of a dual row planting unit 28 may be controlled by rotating one of the metering discs 66 relative to the timing of the input dispensed and the position of a particular input pocket relative to the pocket for the same input on the other adjacent metering disc 66. As shown in FIGS. 2 and 16, in combination, both meters 24 may be positioned side by side and the metering discs 66 driven by an indexed coupler 88 corresponding with the rotational axes of the metering discs 66 of both meters 24. In one embodiment, a chain and sprocket is coupled to one end of the indexed coupler 88 extending to the backside of one of the meters 24 to drive the indexed coupler 88. The two metering discs 66 of each meter 24 are joined together to assure that seed and fertilizer are precisely dispensed such that seed and fertilizer are alternately spaced at approximately equal distance between each other in a twin row seeding configuration. When one meter 24 dispenses seed in the first row, the second meter 24 dispenses fertilizer in the second row. Next, when the one meter 24 dispenses fertilizer in the first row, the second meter 24 dispenses seed in the second row. The result is a precise alternating placement of seed and fertilizer in a staggered pattern in a twin row seeding configuration.

The dual product metering discs 66 contain one or more pin holes to receive pins 86 extending from the hub 74 of one meter 24 and from a hub 84 of the second meter 24. The disc 66 associated with the second meter 24 having hub 84 should have a central opening for one end of the indexed coupler 88 to pass therethrough. The indexed coupler includes a first shaft 92 and a second shaft 96 which are in axial alignment with one another. The first and second shafts 92, 96 are coupled together so that they rotate along their axes relative to one another. However, the first and second shafts 92, 96 may also be locked together to prevent rotation relative to one another when the planting unit 28 is operating.

The first shaft 92 preferably has a distal end portion of a smaller diameter than the diameter at the distal end of the second shaft 96 so that the distal end of the first shaft 92 may be received in rotating engagement within an opening in the distal end of the second shaft 96. The distal end of the second shaft 96 may also have an opening such as a notch 104 for receiving a protuberance such as a removable pin 110 when locking the first and second shafts 92, 96 together to prevent rotation relative to one another. The second shaft 96 may have additional notches along the circumference of the second shaft for receiving the pin 110 so that the first and second shafts 92, 96 may be rotated and locked into different positions relative one another. For example, a notch could be placed one hundred and eighty degrees on the other side of the second shaft 96 so that the metering discs 66 may be rotated one hundred and eighty degrees relative to one another.

When the indexed coupler 88 is locked in one position, the seed and fertilizer from the two metering discs 66 on indexed coupler 88 will dispense seed and fertilizer beside each other in a twin row. When one of the first or second shafts 92, 96 is rotated, for example one hundred and eighty degrees, thereby rotating one of the metering discs 66 one hundred and eighty degrees relative to the other metering disc 66, the meters 24 with the offset metering discs 66 will dispense seed and fertilizer in a precise alternating pattern. In such case, each metering disc 66 preferably includes an odd number of seed pockets 68 and each metering disc 66 includes an odd number of fertilizer pockets 140. For example, a metering disc 66 may have a diameter of ten inches (254 mm) and have fifteen seed pockets and fifteen fertilizer pockets. An alternative larger disc may have twenty-three seed pockets and twenty-three fertilizer pockets.

Figure 17:
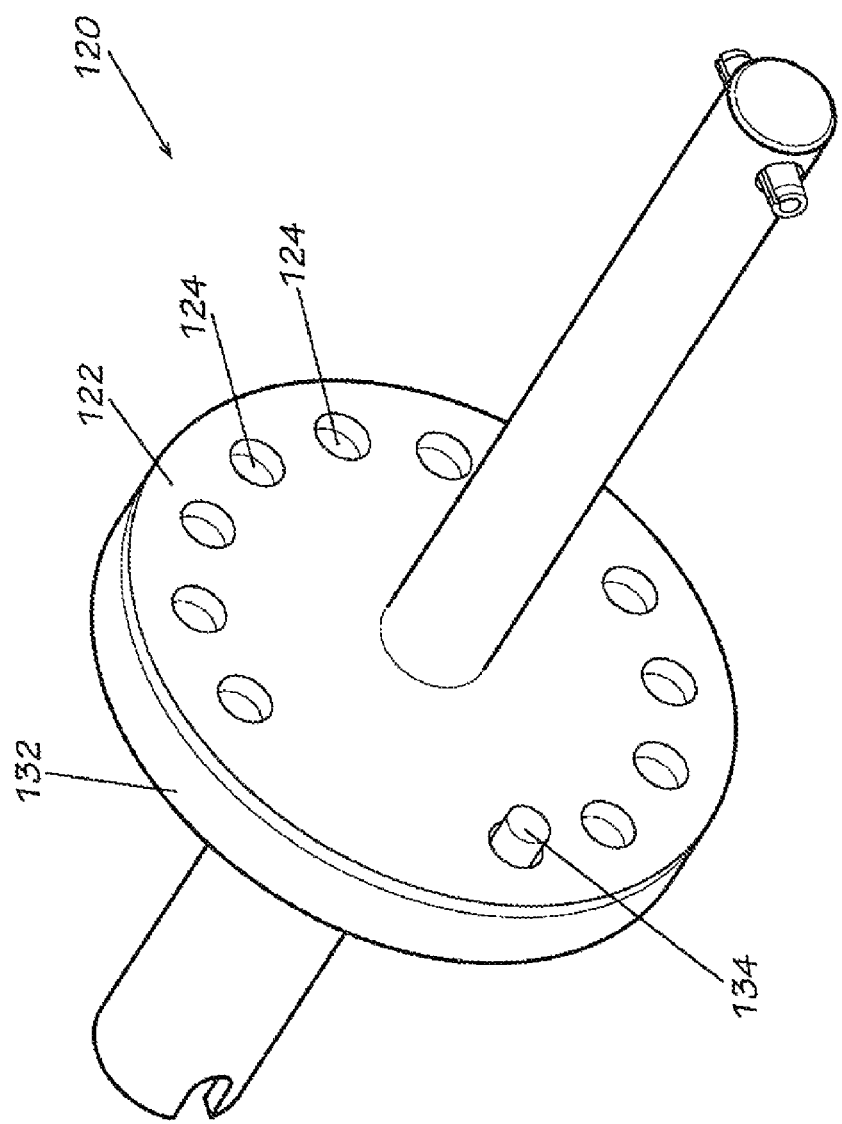
FIGS. 17 and 18 are a perspective of a multi-position clutch for use with offset meters.
Figure 18:
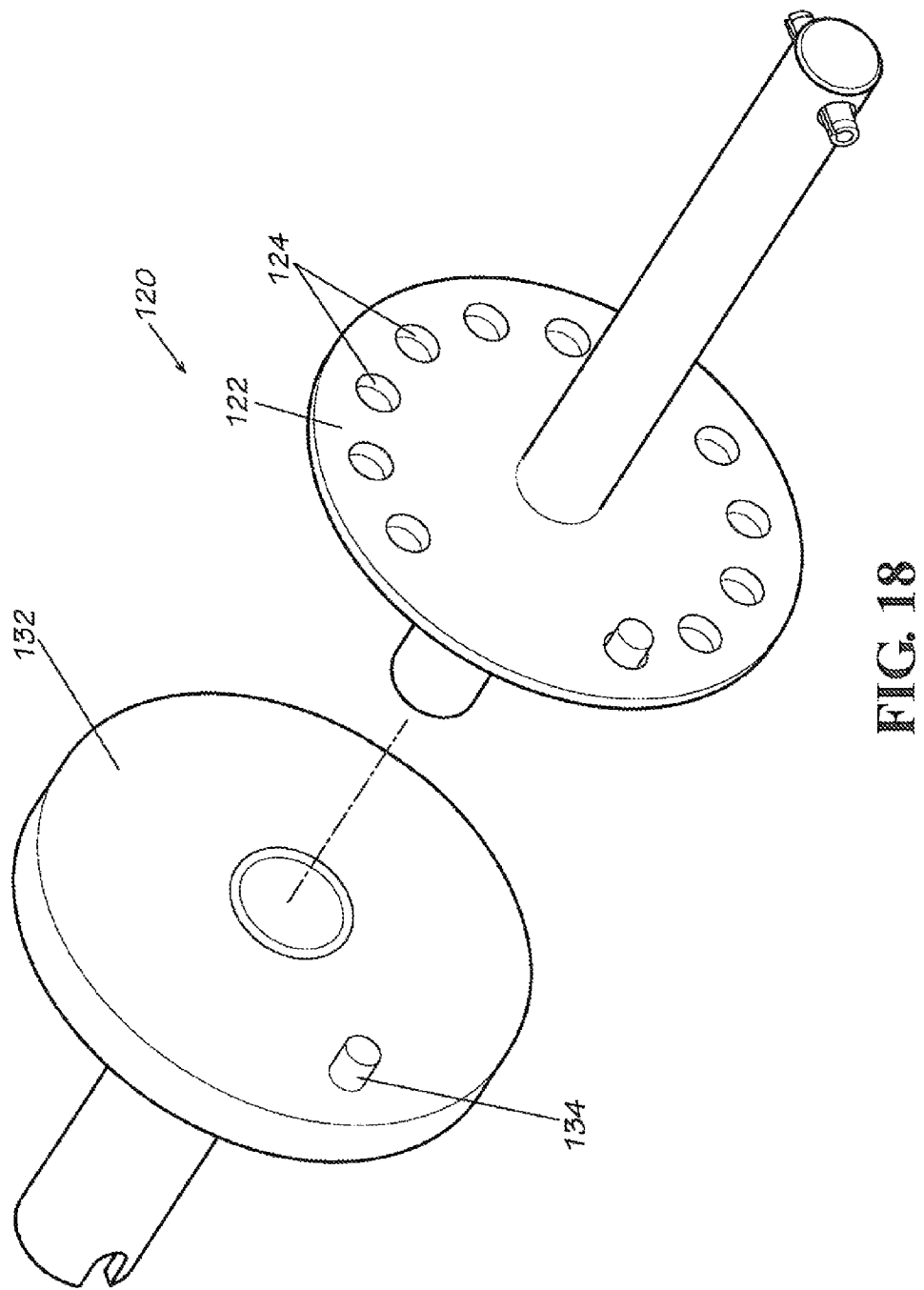

The metering discs 66 can be rotated in increments relative to each other using an alternative indexable coupler 120, sometimes referred to as a multi-positional clutch, as shown in FIGS. 17 and 18. In this case, the one meter 24 may be referred to as the master and the other is referred to as the slave. The master meter 24 is driven by a common drive of the planter 10. The metering discs 66 are pinned and indexed to their respective hubs with the indexable coupler 120.

The indexable coupler 120 serves as an axle or shaft between a pair of side-by-side meters 24 having metering disks 66 which correspond with specific degrees of rotation. This combination allows for a reasonable number of plant population options while at the same time optimizing the spacing between concentrations of fertilizer and seeds. A first disc 122 on a distal end of a first shaft is in rotational axial alignment with a second disc 132 on a distal end of a second shaft. The first and second discs 122, 132 oppose one another. The second disc 132 and has at least one protuberance such as a protruding pin 134 that is sized to mate with one of the holes 124 of the first disc 122. After the two discs 122, 132 are rotated relative to one another, to obtain the desired positional relationship of the seed and fertilizer in adjacent rows, the pin 134 can be positioned in one of the holes 124 of the opposite disc 122 to lock the discs 122, 134 together. In one example, the disc 122 has twelve indexable holes 124 on the same radius that are rotated approximately twenty-six degrees from each other. Any number of indexable holes may be used and the holes may be spaced differently depending on the desired planting. Thus, there may be predetermined plant/seed population not only in regard to having the fertilizer equal distance between seeds in the same furrow but also having the fertilizer approximately equal distant from the opposite seeds in adjacent rows.

The planting units 26, 28 may include an optical, mechanical, magnetic or electric sensor to index a metering disc 66 with one or more other disc meters 66, each dispensing one or more crop input products. Furthermore, the signals could be used to time the placement of liquid fertilizer products in the same row position as dry products, but with a dispense method other than a metering disc with volumetric cavities.

Figure 19:
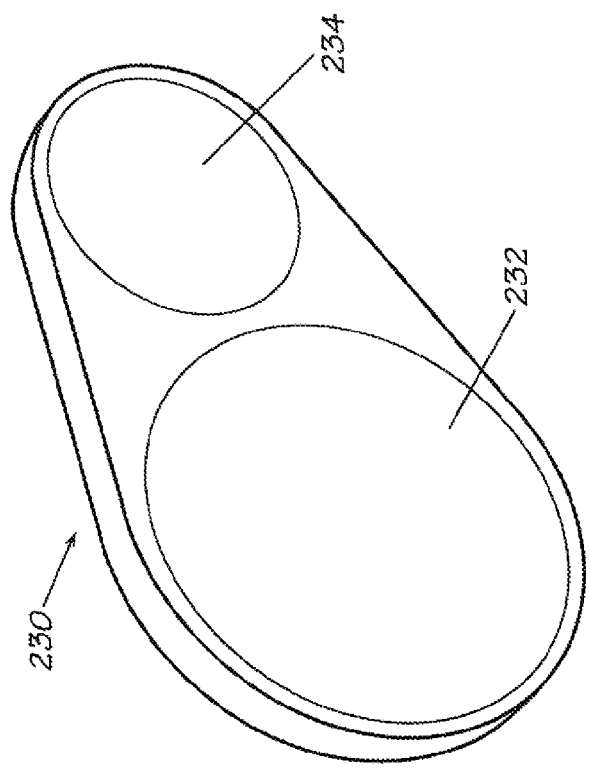
FIG. 19 is a perspective view of a cover for sealing air flow from the meter.
Figure 20:
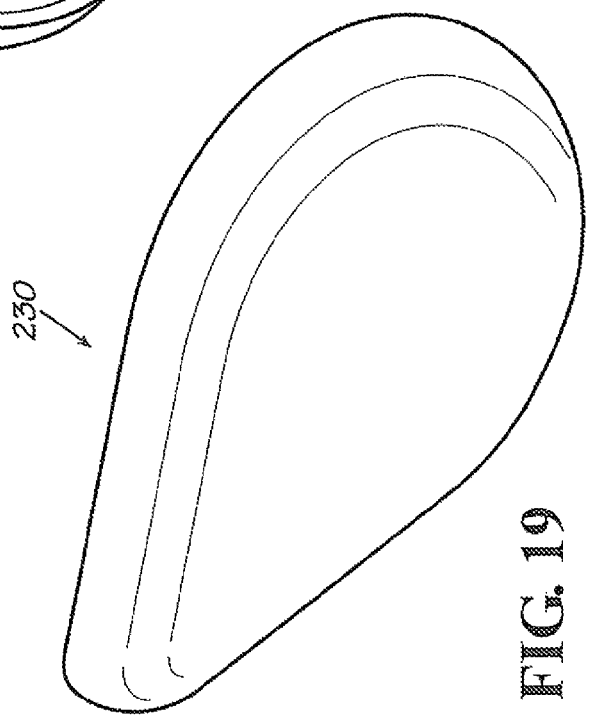
FIG. 20 is a perspective view of the cover of FIG. 19.
Figure 21:
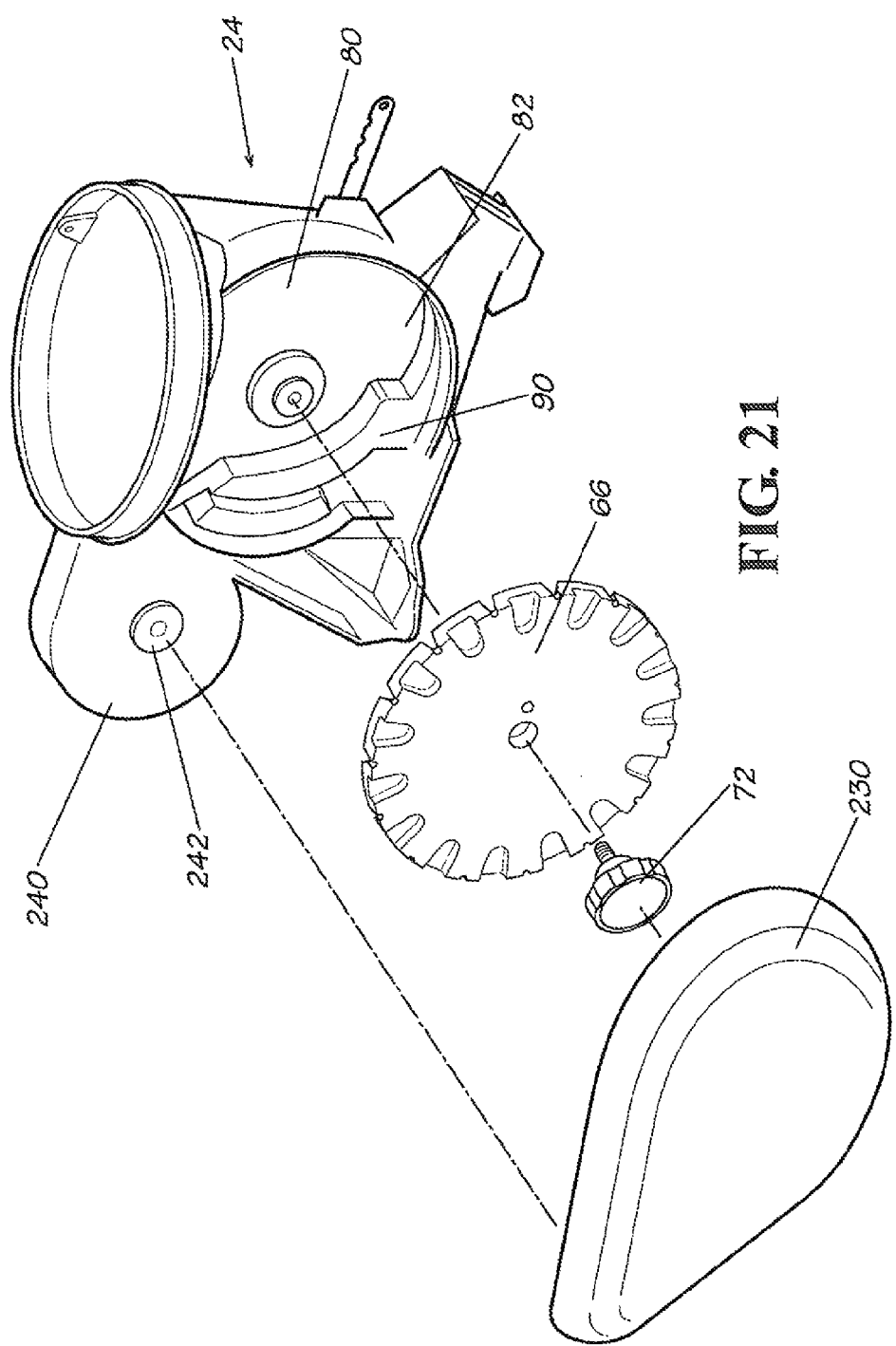
FIG. 21 is an explode perspective view illustrating the cover aligned to be fastened to the meter and a fan.

As explained above, each of the meters 24 may have a dedicate air source such as a fan 240 coupled to the air inlet 60 of the meter 24 as shown in FIG. 21. The air escaping from the meter 24 though the openings 112 or from between the circumference of the metering disc 66 and the meter 24 may be substantially contained by a cover 230, best shown in FIGS. 19 and 20, coupled to the meter 24 over the metering disc 66. The cover 230, while substantially preventing air from escaping directly to the ambient environment, may also provide a return path to the air inlet 60 of the meter 24.

The cover 230 fits over the meter 24 to provide a positive seal around the metering disc 66 and the fan inlet 242 to allow air recirculation with minimal loss to the atmosphere. As shown in FIG. 20 the cover 230 has a large opening 232 sized to correspond with the opening in the meter 24 for receiving the metering disc 66 or to correspond with the metering disc 66 itself when coupled to the metering disc 66 itself. The cover 230 may also define a smaller opening 234 configured to couple with a dedicated return inlet to the air inlet 60 on the side of the air inlet 60 of the meter 24. With the cover 230 fastened to the meter 24 over the metering disc 66 the air escaping through the openings 112 or from between the circumference of the metering disc 66 and the meter 24 may be returned to the air inlet 60 of the meter 24 to substantially defined a closed loop air flow circuit where the air is recirculated through the meter 24 with minimal loss to the ambient atmosphere. The air through the closed loop circuit flows into the meter at air inlet 60 and into the metering chamber 80 through inlet 78, into the seed pockets 68 and out though the openings 112 in the seed pockets 68 and into the opening 232 of cover 230. Once the air is between the cover 230 and the metering disc 66 the air is passed through the passage in the cover 230 to opening 234 coupled to the meter air inlet 60. When the optional passageway 126 is used through the cutoff shelf 90, a portion of the air from the metering chamber 80 may be directed downward through the discharge area 98 and down through the dispensing tube 40.

The cover 230 may be secured to the exterior of the meter 24 with fasteners or may be sized to snap fit to a protruding edge cast in the meter 24 which surrounding the metering disc 66 when attached to the hub 74. Alternatively, the cover 230 could be fastened or snap fit to the metering disc 66 itself so that the cover 230 could rotate with the metering disc 66 where the outer circumference extends in a radial manner to overlap the meter 24 and contact the exterior surface of the meter 24 with minimal drag but minimize the passage of air from between the cover 230 and the meter 24. Also, an air seal of a suitable material such as felt, foam rubber, neoprene or other suitable materials could be placed between the cover 230 and the meter 24 to limit the amount of air flow from between the cover 230 and the meter 24. The cover 230 may be made of polyethylene or other urethanes. Also, any material suitable for containing air flow within the meter 24 may be utilized such as steel, aluminum or fiberglass. Preferably, the cover 230 is rotationally molded because of cost and is transparent when the metering disc 66 is transparent.

In one or more embodiments, a filter may be positioned in the air flow from the meter 24 to clean air to the meter 24 and reduce contamination build up on the metering disc 66. For example, the cover 230 may have a filter between the opening 232 and opening 234. Alternatively a filter may be placed before or at the air inlet 60 or to the fan 240.

As mentioned above, a precision application product planter 10 places concentrated amounts of fertilizer at approximately equal distances between seeds within a seed furrow and/or between seed furrows. The planting units 26, 28 dispense both seed and fertilizer using the same metering device to achieve precision equal distance placement of fertilizer (plant nutrients) and seed. The rows may be evenly spaced or irregular including two or more rows closely spaced with alternating wider row widths for seasonal application of crop inputs and harvesting.

Application techniques which use the meters 24 of the present invention improve nutrient use efficiency by minimizing soil fertilizer contact and subsequent chemical interactions that make applied supplemental nutrients less available for plants. When combined with uniform plant spacing (precision seed placement) these techniques can lead to yield increases and environmental benefits. The equal spacing of plants optimizes sunlight interception. When plants are too close in a single row or in an adjacent row some of the plants may not intercept enough energy from the sun to be fully productive.

To take advantage of precision seed placement, plant nutrients are placed in concentrations at equally or approximately equal spaced or equal distances from the seeds. The seeds and fertilizer may be placed on the top of the ground or in the ground, and each may be placed at different depths. Fertilizers alternately spaced from the seeds insure that each seed is approximately equally spaced from the nutrient concentrations. Also, the precision placement of nutrients allows a larger amount or concentration to be applied at planting then is usually applied with a traditional starter fertilizer program. This practice may also increase micro nutrient availability and uptake in high yield crop production systems.

FIGS. 22-27 show example precision placements of seed and fertilizer using one or more meters 24 with metering discs 66. In regard to FIGS. 23, 25 and 27, a fertilizer attachment known to those skilled in the art may be used in conjunction with one or more embodiments of the present invention when it is desirable to place fertilizer in a furrow separate from the seeds. Fertilizer from the meter 24 with disk 66, another meter, or from some other source of supply may be dispensed to the fertilizer attachment and then to the ground. The fertilizer may be dispensed to the fertilizer attachment from pockets on a metering disc such as metering disk 66 or directly from a separate container in a continuous stream. The fertilizer attachment would be mounted on the planter 10 in a position to place the fertilizer at the proper distance from the seed rows. Preferably the fertilizer attachment is mounted to the lower frame 20. Also, fertilizer from the metering disk 66 of the meter 24 is preferably split off in the discharge area 98 from above the dispensing tube 40 into a tube for the fertilizer attachment. In such case, the fertilizer does not pass through the dispensing tube 40. Directed air flow from the chamber 80, from a dedicated source, or from an air line 62 from of the central fan and air line system may be used to direct the fertilizer from the discharge area 98 away from the dispensing tube and to the fertilizer attachment.

The crop input application system utilizing the planting units 26, 28 with meters 24 precisely places singulated seeds and concentrations of crop nutrients in a spatial pattern that achieves improved sunlight interception and increased nutrient use efficiency by plants. FIG. 22 illustrates twin or narrow rows with fertilizer equally spaced between seeds in the seed furrow. The twin rows in FIG. 22 are planted with two dual row planting units 28 with each planting unit 28 having a pair of meters 24 and each meter 24 having a metering disc 66. The three narrow rows illustrated in FIG. 22 are planted with three single row planting units 26 each having a single meter 24 with a metering disc 66. As shown in FIG. 22, the twin row planting unit 28 places single seeds in two closely spaced rows, with the seed alternating systematically between the rows. At the approximately same time a concentration of nutrients (fertilizer) is dispensed between the seeds in a row and directly across from the seed in the adjacent twin row.

Figure 23:
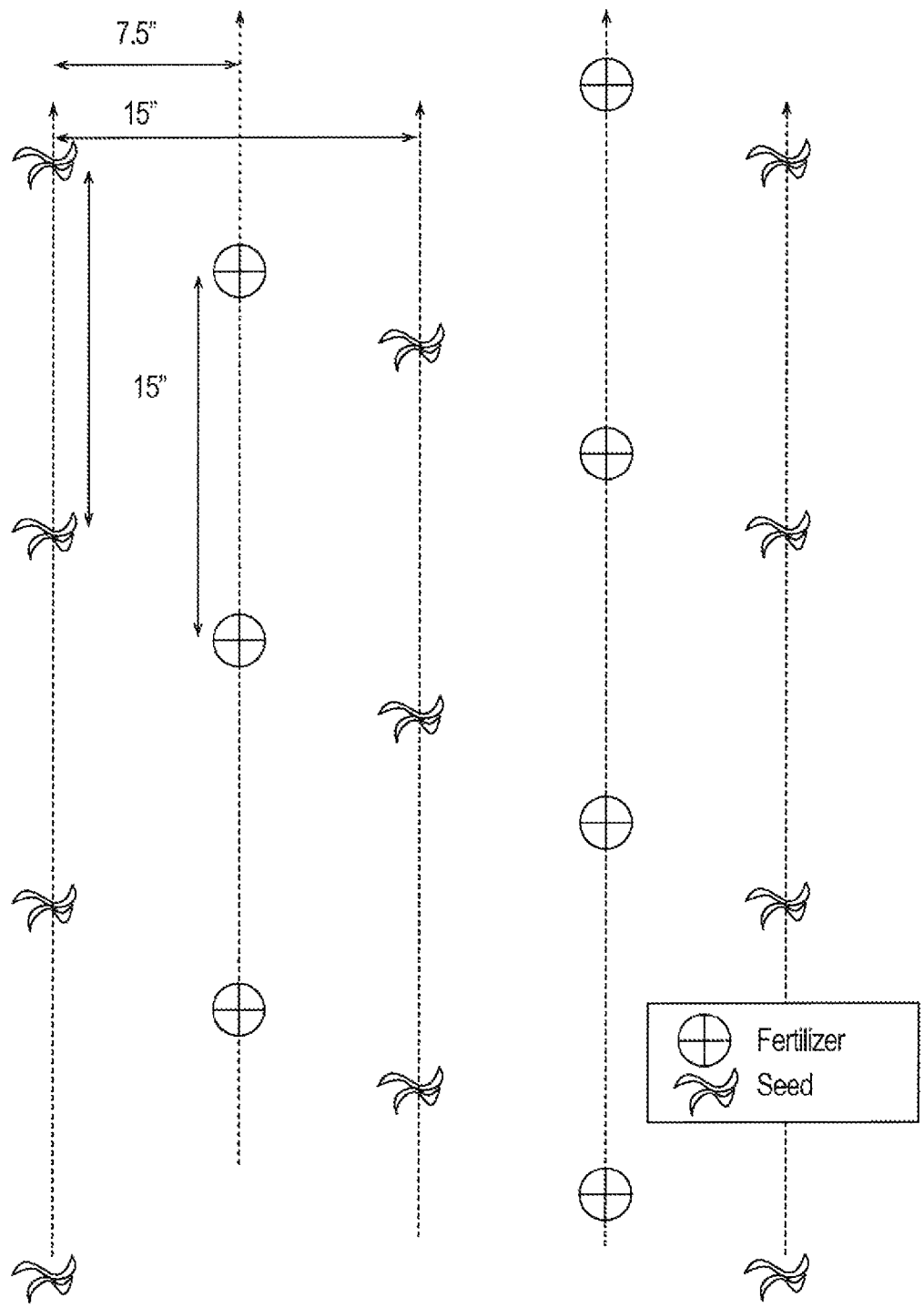
FIG. 23 illustrates seeds planted in fifteen inch rows with an equal number of concentrations of fertilizer granules in fifteen inch rows where the seed and fertilizer rows are alternated, and with the fertilizer rows offset from the seed rows by about seven and a half inches.
Figure 24:
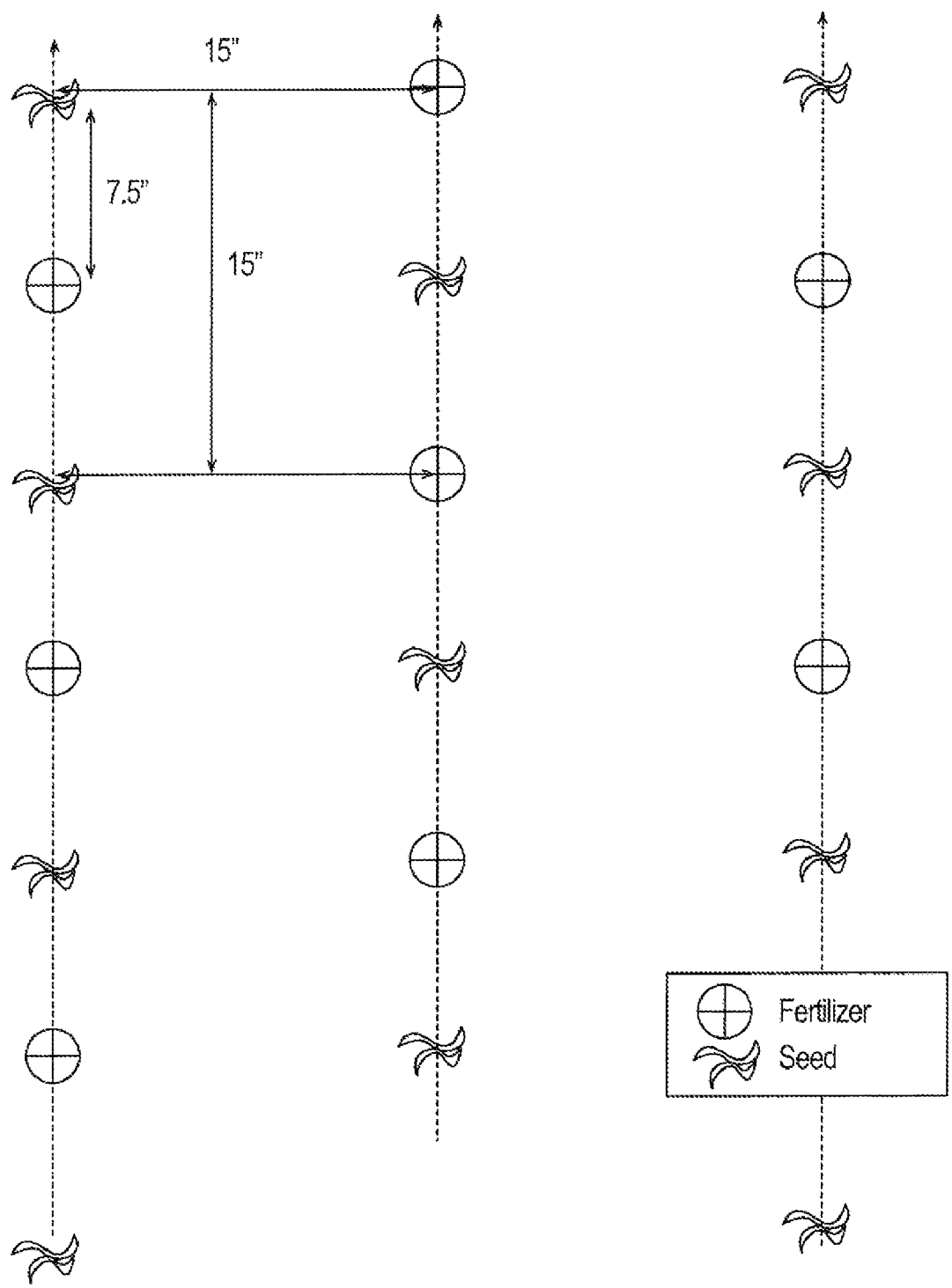
FIG. 24 illustrates seeds planted in fifteen inch rows with an equal number of concentrations of fertilizer granules equally spaced in each seed row where the seeds and fertilizer granules are alternated in each row.

FIGS. 23 and 24 illustrate equally spaced rows. As shown in FIG. 23 seeds are planted in fifteen inch rows with an equal number of fertilizer granule concentrations in fifteen inch rows where the seed and fertilizer rows are alternated with the fertilizer rows offset from the seed rows by about seven and a half inches. FIG. 24 illustrates seeds planted in fifteen inch rows with an equal number of fertilizer granules equally spaced in each seed row where the seeds and fertilizer granules are alternated in each row.

Figure 25:
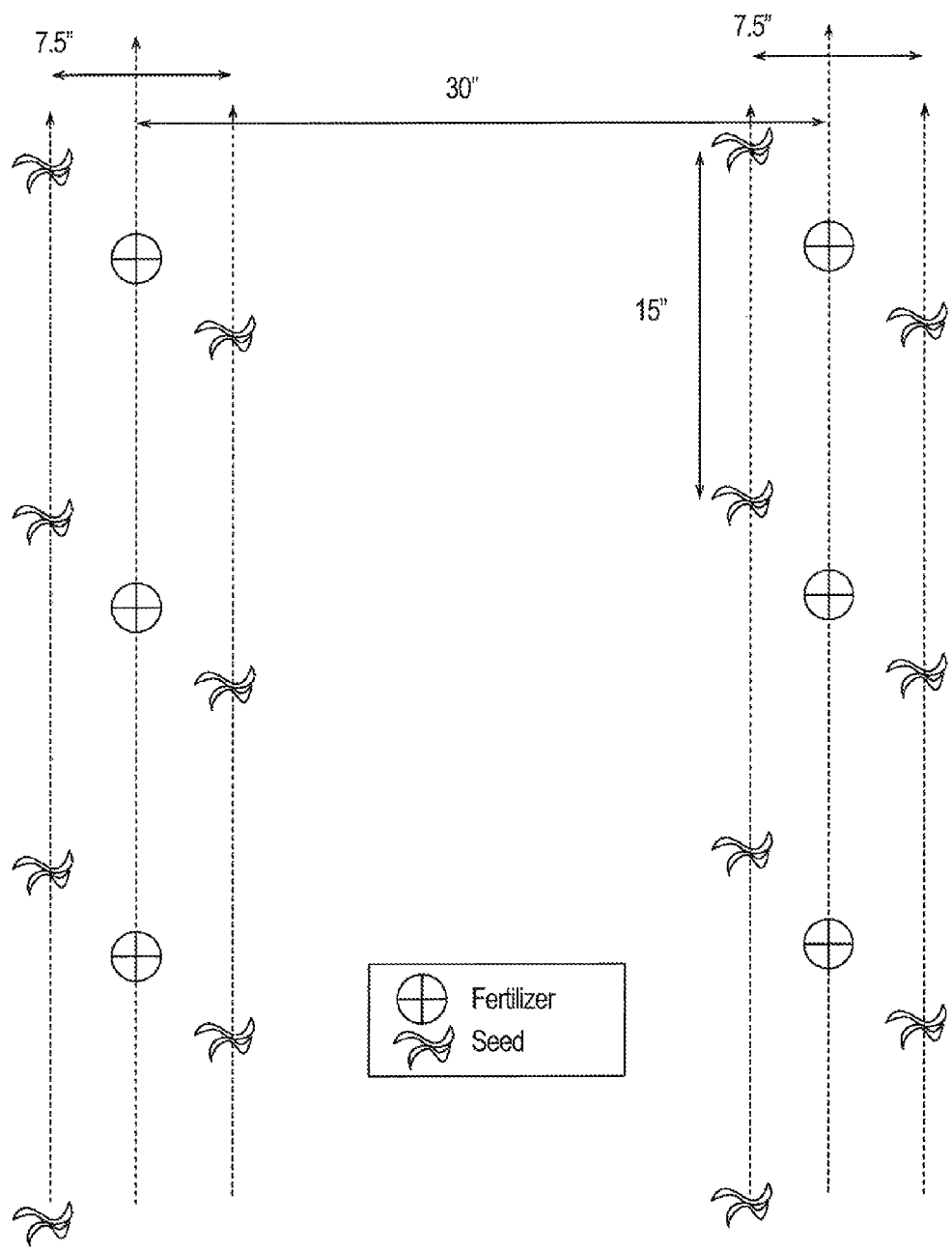
FIG. 25 illustrates seeds planted in twin rows spaced about seven and a half inches apart, where the fertilizer granules are in a row spaced between each row of seeds in a twin row, and where adjacent twin rows are spaced on center of about thirty inches.
Figure 26:
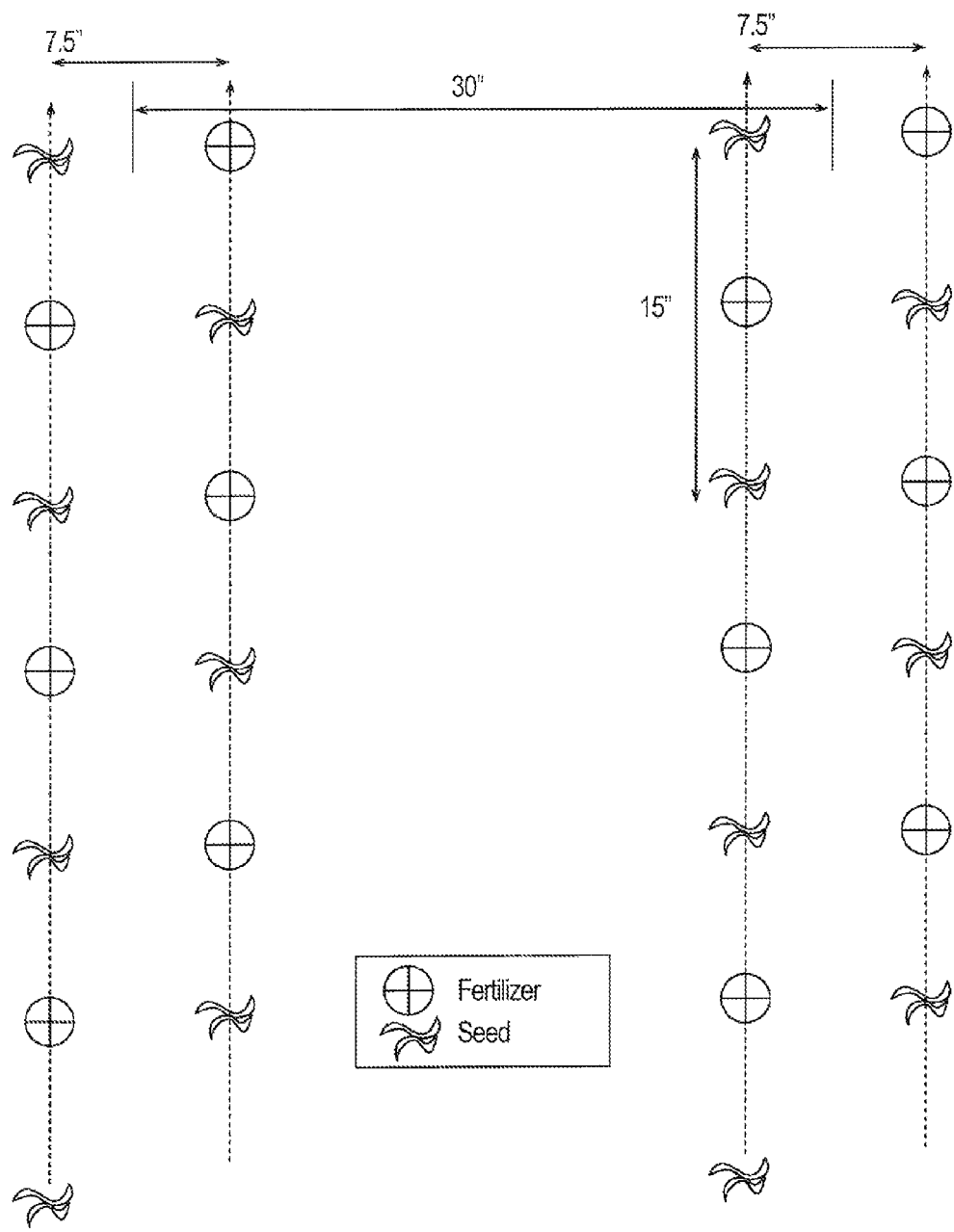
FIG. 26 illustrates a close up of the twin row of FIG. 22 where the seeds are planted in seven and a half inch spaced twin rows with concentrations of fertilizer granules equally spaced between seeds within seed furrows.
Figure 27:
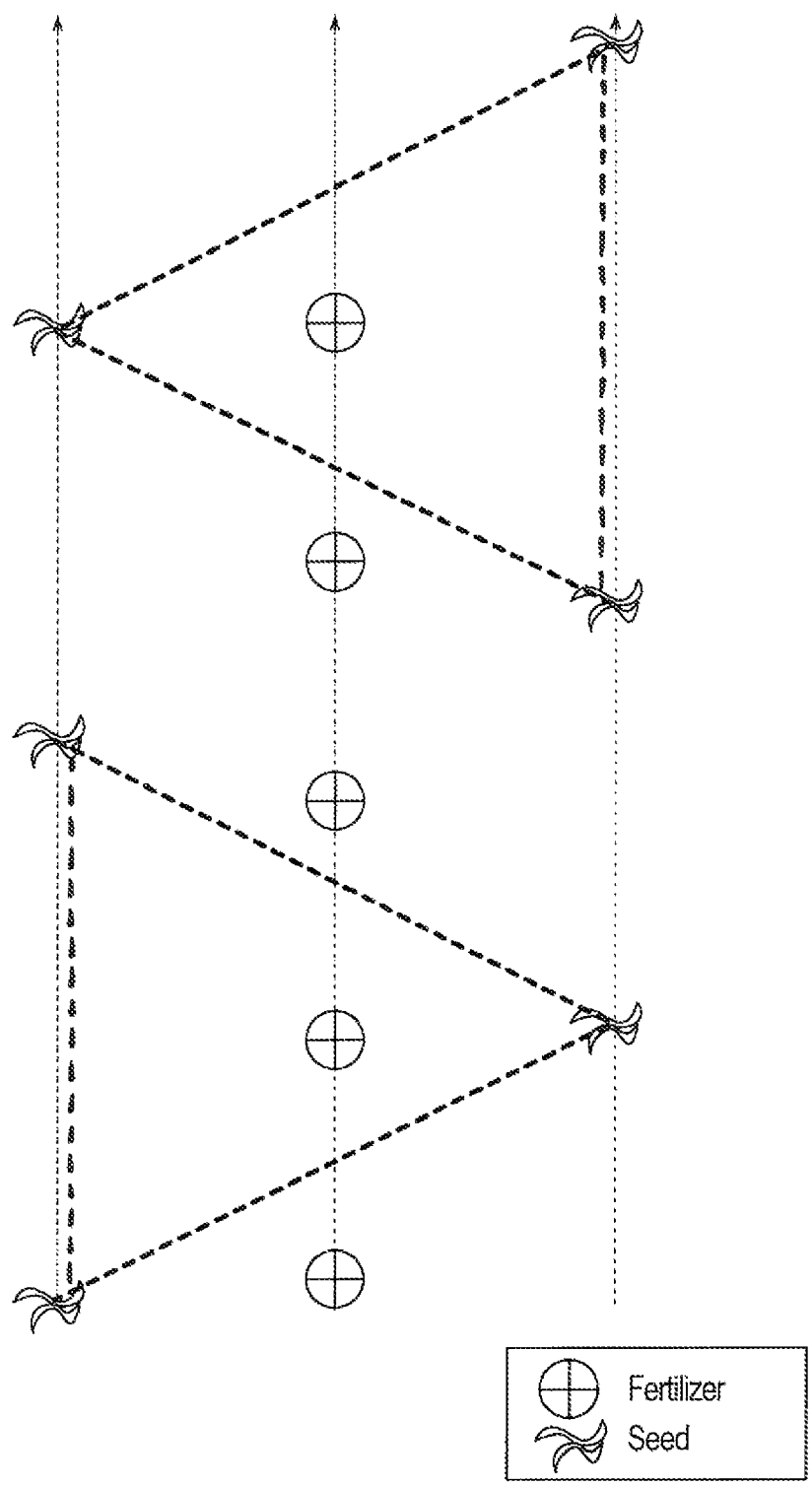
FIG. 27 illustrates a twin or narrow row seeding pattern with concentrations of fertilizer granules in rows and approximately equal distance between the seeds in the seed rows.

Seeds may be dispensed in alternating patterns in adjacent rows as shown in FIGS. 25-27. FIG. 25 illustrates seeds planted in twin rows of about seven and a half inches, where the fertilizer granules are in a row spaced between each row of seeds of a twin row, and where adjacent twin rows are spaced on center of about thirty inches. FIG. 26 illustrates seeds planted in seven and a half inch spaced twin rows with the fertilizer intermittently spaced within each seed row. FIG. 27 illustrates twin row seeding with a fertilizer row in between the seed rows of a twin row. The fertilizer placement is such that the fertilizer is approximately equally spaced from adjacent seeds of each row of a twin row. This allows a single row of fertilizer granule concentrations to provide nutrients to two adjacent seed rows. The fertilizer is precisely placed and spaced with respect to the precision placed seed on each side of the fertilizer.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An apparatus for use in seed planting comprising:
seed placement structure operable to place a plurality of spaced apart seeds in the soil, wherein said seed placement structure comprises a plurality of seed pockets on one side of a rotatable metering disc;
fertilizer placement structure comprising a plurality of fertilizer pockets on the opposite side of said metering disc, said fertilizer placement structure operable to place multiple discrete fertilizer deposits in contact with the soil in such a manner that each fertilizer deposit is approximately equidistantly spaced from both seeds of a pair of spaced apart seeds placed in contact with the soil by said seed placement structure; and
a first dispensing tube, said metering disc being disposed to discharge seed and fertilizer from said seed and fertilizer pockets in alternating succession through said first dispensing tube, wherein each of said plurality of seed pockets has an opening extending from said seed pocket to the opposite side of the metering disc and each of said plurality of fertilizer pockets does not have an opening extending from said fertilizer pocket to the side of the metering disc having the seed pockets, said openings enabling air pressure to be used to temporarily retain seeds in said seed pockets.

2. The apparatus of claim 1 wherein said seed pockets and said fertilizer pockets being arranged in alternating succession around the periphery of said metering disc so that a fertilizer pocket is offset circumferentially from each seed pocket and is disposed between each pair of successive seed pockets.

3. The apparatus of claim 1 further comprising a seed chamber and a fertilizer chamber communicating with opposite sides of said metering disc for supplying seeds to one side of said metering disc and fertilizer to the opposite side of said metering disc.

4. The apparatus of claim 1 further comprising directed air across each said seed pocket in succession as each said seed pocket moves in proximity to a discharge area to assist in releasing seeds from said seed pockets to said discharge area.

5. The apparatus of claim 4 wherein each of said seed pockets being perforated by said openings to permit the use of one of vacuum or positive pressure air for temporarily retaining seeds in said seed pockets.

6. The apparatus of claim 1 further comprising a transfer chamber assembly comprising a channel, said channel facing said opposite side of said metering disc and communicating with said fertilizer pockets to provide fertilizer to said fertilizer pockets as the metering disc rotates.

7. The apparatus of claim 6 wherein said transfer chamber assembly further comprises a holding portion in said channel.

8. The apparatus of claim 6 wherein said transfer chamber assembly further comprises a deflector in said channel.

9. The apparatus of claim 6 wherein directed air is provided into said channel to assist fertilizer from said fertilizer pockets.

10. The apparatus of claim 1 further comprising a hopper having a first chamber for seeds and a second chamber for fertilizer, wherein seed are provided to said seed pockets from said first chamber and fertilizer is provided to said fertilizer pockets from said second chamber.

11. The apparatus of claim 1 wherein said apparatus further comprises a cover having a main body with a first opening generally sized and configured for detachably engaging said apparatus and to be positioned relative said metering disc, said cover preventing air flow from said metering disc to the ambient environment during dispensing of seed and fertilizer.

12. The apparatus of claim 11 wherein said cover comprises first and second openings communicating with one another to allow air flow from one opening to the other.

13. The apparatus of claim 12 wherein said second opening communicates with an air source.

14. The apparatus of claim 11 wherein air is recirculated from said apparatus through said cover.

15. The apparatus of claim 14 wherein a closed air flow loop is substantially defined through said openings of said cover and said apparatus.

16. The apparatus of claim 11 wherein said fertilizer placement structure includes a plurality of fertilizer pockets on the opposite side of said metering disc.

17. The apparatus of claim 1 wherein said seed placement structure includes a first plurality of seed pockets on one side of said first rotatable metering disc, a second plurality of seed pockets on one side of a second rotatable metering disc, said fertilizer placement structure including a first plurality of fertilizer pockets on the opposite side of said first metering disc, and said fertilizer placement structure including a second plurality of fertilizer pockets on the opposite side of said second metering disc.

18. The apparatus of claim 17 further comprising a second dispensing tube, said first metering disc being disposed to discharge seed and fertilizer in alternating succession through said first dispensing tube, and said second metering disc being disposed to discharge seed and fertilizer in alternating succession through said second dispensing tube.

19. The apparatus of claim 17 wherein said first metering disc deposits both seed and fertilizer in a first row and said second metering disc deposits both seed and fertilizer in a second row.

20. The apparatus of claim 19 wherein said fertilizer in said first and second rows is spaced approximately equidistant from the seeds in said first and second rows.

21. The apparatus of claim 17 further comprising an indexable coupler coupled between said first and second metering discs, said coupler having a first shaft coupled to said first metering disc and a second shaft coupled to said second metering disc, said first and second shafts coupled end to end in axial alignment along a rotational axis of said metering discs, said first and second shafts rotatable relative one another to index said metering disc together and lockable relative one another to prevent rotation about the rotational axis while operating said apparatus.

* * * * *